(12) United States Patent
Saitoh et al.

(10) Patent No.: US 7,690,810 B2
(45) Date of Patent: Apr. 6, 2010

(54) ILLUMINATION DEVICE AND DISPLAY DEVICE

(75) Inventors: Goroh Saitoh, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 203 days.

(21) Appl. No.: 11/531,343

(22) Filed: Sep. 13, 2006

(65) Prior Publication Data

US 2007/0058359 A1 Mar. 15, 2007

(30) Foreign Application Priority Data

Sep. 13, 2005 (JP) .............................. 2005-264709

(51) Int. Cl.
  *F21V 5/00* (2006.01)
(52) U.S. Cl. ..................... 362/246; 362/555; 362/561; 362/244; 362/606; 362/612; 362/615; 362/613; 362/620; 362/626; 362/330
(58) Field of Classification Search .................. 362/97, 362/555, 561, 244, 330, 329, 246, 606, 612, 362/615, 613, 620, 626
See application file for complete search history.

(56) References Cited

U.S. PATENT DOCUMENTS

| | | | | |
|---|---|---|---|---|
| 5,479,275 A | * | 12/1995 | Abileah | .......................... 349/5 |
| 6,139,162 A | * | 10/2000 | Masaki | ........................ 362/618 |
| 6,474,826 B1 | * | 11/2002 | Tanaka et al. | ................ 362/612 |
| 6,837,588 B2 | * | 1/2005 | Kunimochi et al. | ......... 362/617 |
| 6,913,366 B2 | * | 7/2005 | Lee | ............................ 362/628 |
| 7,213,936 B2 | * | 5/2007 | Wang et al. | .................. 362/223 |
| 7,223,005 B2 | * | 5/2007 | Lamb et al. | .................. 362/615 |
| 2004/0213000 A1 | * | 10/2004 | Chang | ........................ 362/328 |

FOREIGN PATENT DOCUMENTS

| | | |
|---|---|---|
| JP | 2001-23423 | 1/2001 |
| JP | 2001-057106 | 2/2001 |
| JP | 2002-250820 | 9/2002 |
| JP | 2002-352611 | 12/2002 |
| JP | 2005-228700 | 8/2005 |

* cited by examiner

*Primary Examiner*—Sandra L O'Shea
*Assistant Examiner*—Jessica L McMillan
(74) *Attorney, Agent, or Firm*—Dickstein Shapiro LLP

(57) ABSTRACT

A plurality of LEDs are arrayed in the X-direction, and a light-guide plate is provided facing the LEDs. A plurality of prisms extending in the Y-direction are formed on a light-receiving surface of the light-guide plate. A plurality of prisms are additionally formed on a light-emitting surface of the light-guide plate. Light emitted from the LED is thereby divided into a plurality of light beams by the prisms, and a portion of the light is condensed toward the prisms. Light that is condensed toward the prisms is divided in a plurality of directions and transmitted in the light-guide plate. When the light reaches another prism, the light is reflected by the prism and emitted from the light emitting surface.

28 Claims, 26 Drawing Sheets

INCIDENT LIGHT DISTRIBUTION

EMITTED LIGHT DISTRIBUTION

ILLUMINATION DEVICE AND DISPLAY DEVICE

BACKGROUND OF THE INVENTION

1. Field of the Invention

The present invention relates to an illumination device comprising a point light source that diffuses and emits light emitted from the point light source, and to a display device comprising this illumination device.

2. Description of the Related Art

In recent years, the use of LEDs (light emitting diodes) as illumination devices for in-home use and light sources for backlights of liquid crystal display devices in place of fluorescent lamps and cold-cathode fluorescent lamps (CCFL) has been actively examined. LEDs are more environmentally friendly when compared with CCFLs and the like, and have the potential to reduce energy consumption in the future. However, LEDs are small when compared with illumination devices, and resemble point light sources. Therefore, the light emitted from an LED must be linearly or in a plane diffused. Additionally, the amount of light emitted per LED is smaller than the amount of light emitted per fluorescent lamp or cold-cathode fluorescent lamp. Several LEDs must therefore be used in order to produce the same amount of light as a fluorescent lamp or cold-cathode fluorescent lamp.

However, characteristics of commercially available LEDs such as the amount of light emitted vary greatly in individual units, and, for example, a difference of about ±15% in luminosity may occur. For this reason, when a plurality of LEDS are used in the manufacture of an illumination device, irregularities in illumination intensity and brightness occur. These irregularities in illumination intensity and brightness are a serious problem particularly when such an illumination device is used as the backlight of a liquid crystal display device. To solve this problem, the LEDs mounted in the illumination device must be adequately sorted. However, when the LEDs are sorted, the cost of the device increases. Therefore, when a plurality of LEDs are provided as the light sources of an illumination device, light emitted by the LEDs must be mixed so as to be homogeneous.

Individual LEDs emitting red (R), green (G), and blue (B) light are provided to a single illumination device, and the light emitted from the colored LEDs is mixed to produce white light, thereby making it possible to produce an illumination device having excellent color reproducibility. In such devices as well, the light emitted from the colored LEDS must be mixed so as to be homogeneous.

Publicly known document 1 (Japanese Laid-Open Patent Application 2001-57106 (pages 2-5, FIG. 2)) discloses a technique wherein a plurality of point light sources are provided to an illumination device, a single light-guide body for one-dimensionally diffusing the light emitted from these point light sources is provided to each point light source, and a single transparent substrate for diffusing in a plane the linear light incident on the side surface via the light-guide bodies is further provided. The light-guide body is composed of a transparent material, has a linearly extending wedge shape, and is disposed alongside the transparent substrate. In publicly known document 1, the light emitted from the point light source is thereby linearly diffused by the light-guide body, and further diffused in a plane by the transparent substrate.

Publicly known document 2 (Japanese Laid-Open Patent Application 2001-23423 (pages 2-5, FIGS. 1, 7)) and Publicly known document 3 (Japanese Laid-Open Patent Application 2002-250820 (pages 2, 4-5, FIG. 1)) disclose a technique wherein a single point light source (LED) and a single light-guide member in the form of a plate, onto whose side surface the light emitted from the point light source is incident, are provided to an illumination device, and a blind hole for laterally dividing the light incident from the point light source is formed on the light-guide member. In publicly known documents 2 and 3, the light incident from the point light source on the light-guide member is changed to a planar state and made uniform in a single step by the blind hole and a peripheral reflective surface. In addition, FIG. 7 in publicly known document 2 discloses a technique wherein two point light sources are provided, and two blind holes are formed on the light-guide member.

In addition, publicly known document 4 (Japanese Laid-Open Patent Application 2002-352611 (pages 2-7, FIGS. 1, 2)) discloses an illumination device comprising a plurality of point light sources and a plurality of Fresnel lenses corresponding to the point light sources. The light incident from the point light source on the Fresnel lenses is oriented in a prescribed direction. In addition, for a given area of the Fresnel lenses, the light incident from the point light source corresponding to the Fresnel lens adjacent to this region is also oriented in the prescribed direction when viewed from the optical axis of the Fresnel lens. In publicly known document 4, an illumination device having a uniform distribution of emitted light intensity can thereby be realized.

On the other hand, the present inventors have developed a technique wherein a light source and light-guide plate are provided to an illumination device, the light-emitting surface of the light-guide plate is provided with a light divider for dividing in mutually different directions the light from the light source that is directed into the light-guide plate, and a prism for reflecting the light divided by the light divider toward the light-emitting surface is provided to a region in which light from the light source in not received directly on the light-receiving surface of the light-guide plate. This technique is disclosed in publicly known document 5 (Japanese Laid-Open Patent Application 2005-228700 (pages 2-7, FIG. 1)). The distribution of the quantity of light emitted by this illumination device is uniform, and the angle of the light emitted is narrow.

However, problems such as those described hereafter are presented in the above-described prior art. In the illumination device disclosed in publicly known document 1, a wedge-shaped light-guide body is provided for each point light source. Therefore, a plurality of light-guide bodies are needed when a plurality of point light sources are to be provided, inevitably increasing the cost. Also, the light-guide body is disposed alongside the transparent substrate, and, as a result, the peripheral space inevitably expands when the number of light-guide bodies is increased.

In the illumination devices disclosed in publicly known documents 2 and 3, there is only one position in which the light sources should be disposed with respect to a single blind hole/reflective plate combination, and it is therefore difficult to place a plurality of point light sources in this position. In addition, in FIG. 7 of publicly known document 2, two blind hole/reflective plate combinations are provided, and two point light sources are provided so as to correspond with the combinations. However, in this configuration, the light emitted from the two point light sources cannot be mixed. Therefore, when LEDs are used as the point light sources, irregularities caused by differences between the individual LEDs readily occur. Additionally, because the light emitted from the point light sources cannot be mixed, RGB-emitting LEDs cannot be used as the light source.

Furthermore, in a given region (e.g., a region on the left side) of the Fresnel lenses of the illumination device disclosed in publicly known document 4, light that is incident from the point light source (e.g., a central point light source) corresponding to the Fresnel lens, and light that is incident from another point light source (e.g., a right-side point light source) corresponding to the Fresnel lens adjacent to this region are emitted in the same direction, as seen from the optical axis of the Fresnel lens. Therefore, the light emitted from the two mutually adjacent point light sources can be partially mixed. However, when light emitted from a point light source (i.e., the left-side point light source) corresponding to a Fresnel lens that is adjacent to the opposite side of this region, as seen along the optical axis of the Fresnel lens, is incident on the abovementioned region of the Fresnel lenses, the light cannot be directed in a prescribed direction. Also, even the light incident from point light sources disposed in positions further away cannot be directed in a prescribed direction. For this reason, there is a limit to the light mixing effect, and, while light emitted from, e.g., two mutually adjacent point light sources can be partially mixed, light emitted from three point light sources cannot be uniformly mixed. Consequently, white light is difficult to produce when using RGB-emitting LEDs as the light sources. Additionally, as shown in FIG. 14 of publicly known document 4, only an intensity of about 70% of intensity along the optical axis can be achieved in the peripheral areas of the unit Fresnel lenses, and uniformity is inadequate.

Still further, in the illumination device disclosed in publicly known document 5, the light-guide plate merely divides and emits light emitted from a corresponding light source, and the mixing and homogenization of light emitted from a plurality of light sources is not taken into account.

SUMMARY OF THE INVENTION

It is an object of the present invention to provide an illumination device that uniformly distributes emitted light, is compact, and is inexpensive; and to provide a display device comprising this illumination device.

The illumination device according to the present invention has a light source; and a light-guide plate for receiving, via a first surface thereof, light emitted from the light source, and emitting the light being emitted via a second surface thereof; wherein the light-guide plate has a plurality of condensers that are formed on the first surface and that condense the light incident from the light source, and a light divider that is formed on the second surface and that divides the light condensed by the condensers into a plurality of different directions that intersect with a thickness direction of the light-guide plate; and wherein light condensed by one condenser and divided by the light divider is emitted from the second surface by another condenser.

In the present invention, when one condenser condenses light emitted from the light source toward the light divider, the light divider divides this light in a plurality of directions, and the divided light is transmitted inside the light-guide plate until the light has reached another condenser, whereupon another condenser emits this light via the second surface of the light-guide plate. Light emitted from the light source can thereby be diffused uniformly. In addition, this diffusion can be performed merely by the light-guide plate, and the illumination device can therefore be compactly and inexpensively manufactured.

Furthermore, a plurality of the light sources are provided, and another light source is preferably disposed within an area where the light emitted from one of the light sources is divided, as seen from the thickness direction of the light-guide plate. The light emitted from the light sources can thereby be mixed.

The display device according to the present invention comprises the abovementioned illumination device and a display panel for receiving light emitted from the illumination device.

According to the present invention, an illumination device that uniformly distributes emitted light, is compact, and is inexpensive can be realized.

BRIEF DESCRIPTION OF THE DRAWINGS

FIGS. 6A and 6B are optical model diagrams showing an operation of the present embodiment in which light emitted from an LED is deflected by the prism 5 and condensed by a prisms 8, wherein FIG. 6B shows a case in which a flat part is provided, and FIG. 6B shows a case in which a flat part is not provided;

DESCRIPTION OF THE PREFERRED EMBODIMENTS

Figure 1:
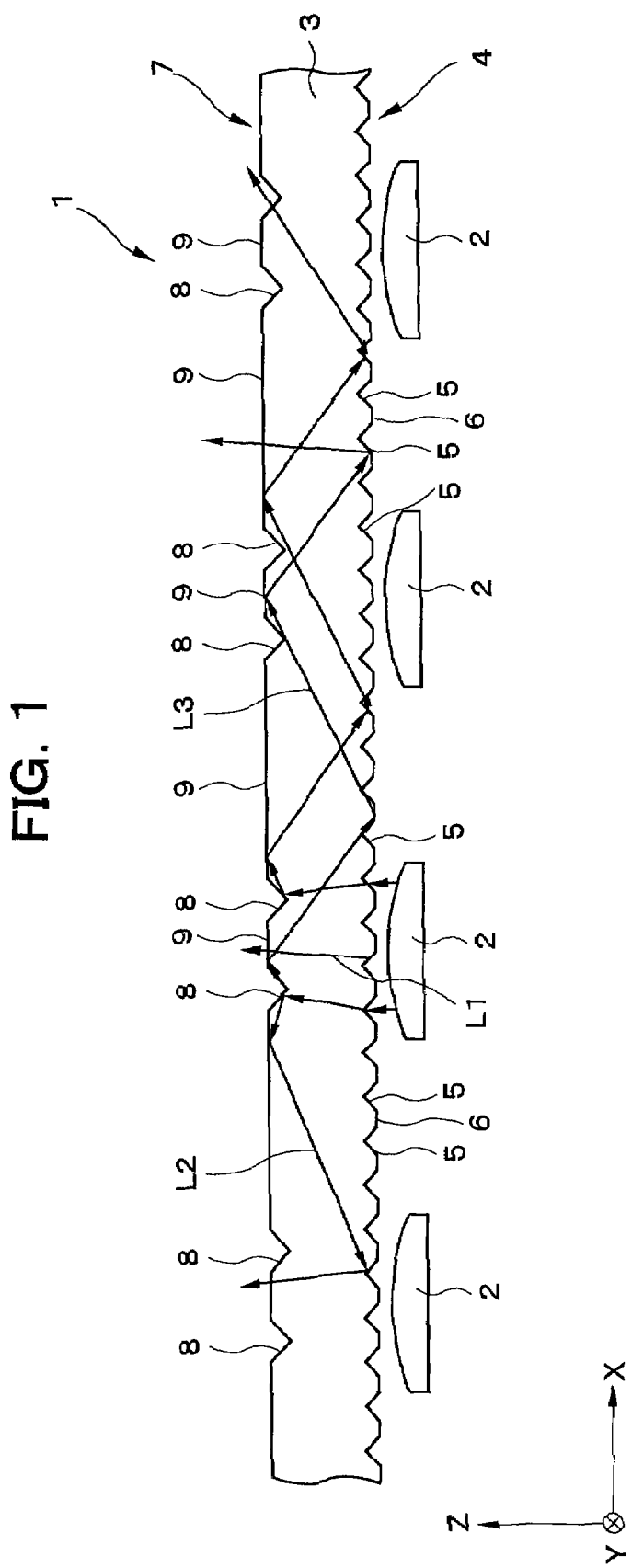
FIG. 1 is an optical model diagram showing an illumination device according to a first embodiment of the present invention.
Figure 2:
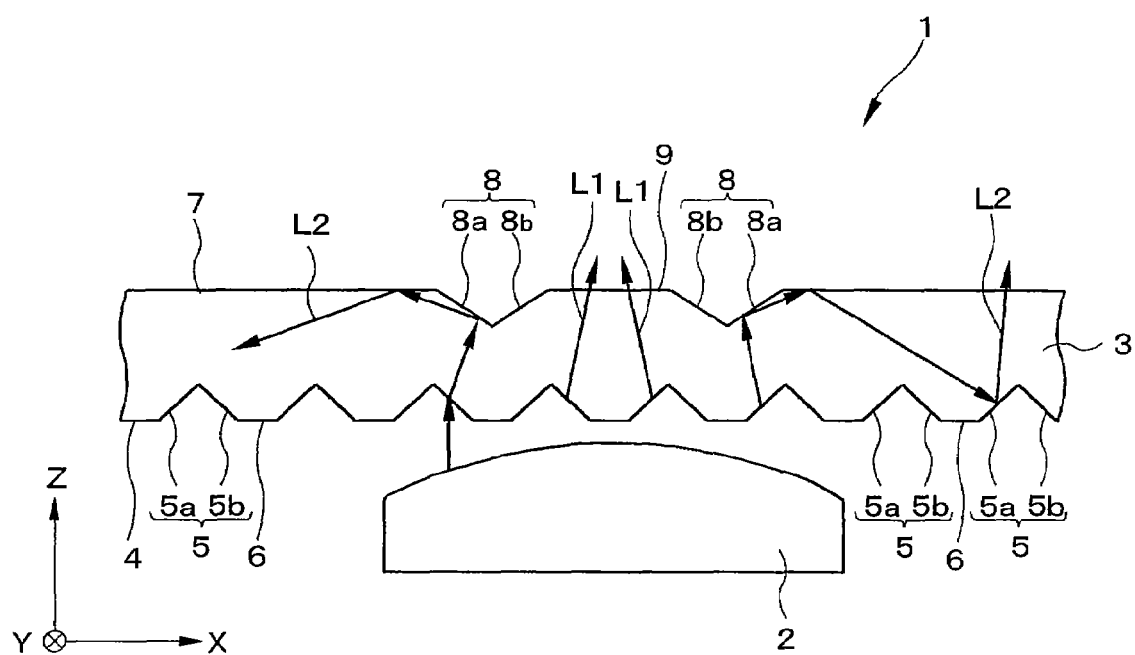
FIG. 2 is a partial enlarged view of FIG. 1.

Preferred embodiments of the present invention are described hereunder in detail with reference to the accompanying drawings. First, a first embodiment of the present invention is described. FIG. 1 is an optical model diagram showing an illumination device according to the present embodiment. FIG. 2 is a partial enlarged view of FIG. 1. As shown in FIGS. 1 and 2, in the illumination device 1 according to the present embodiment, a plurality of LEDs 2 are arrayed in a single row, and a single light-guide plate 3 is provided and is directed toward the LEDs 2. The array direction of the LEDs 2 is parallel to the front surface of the light-guide plate 3. The light-guide plate 3 is formed from glass, acrylic resin, or another transparent material. The light-guide plate 3, for example, may be manufactured by molding a transparent resin material by injection molding, hot-pressing, cutting, or another method. In the present embodiment, the array direction of the LEDs 2 is the X-direction; the thickness direction of the light-guide plate 3, i.e., the direction facing from the LEDs 2 toward the light-guide plate 3 is the Z-direction; and the direction perpendicular to both the X-direction and Z-direction is the Y-direction. The X-direction, Y-direction, and Z-direction are mutually perpendicular.

A plurality of prisms 5 extending in a single direction are formed on a surface of the light-guide plate 3 on the side facing the LEDS 2; i.e., a light-receiving surface 4. The array direction of the prisms 5 is the same direction as the array direction of the LEDs 2, i.e., the X-direction; and the extending direction of the prisms 5 is the direction perpendicular to the array direction of the LEDs 2, i.e., the Y-direction. The prisms 5 are composed of a pair of inclined surfaces 5a and 5b that extend in the Y-direction, and are triangular prisms whose ZX cross-sectional shape perpendicular to the Y-direction is triangular. In other words, as seen from the Y-direction, a triangular concave part is formed on the light-receiving surface 4, and a line tangential to the inclined surfaces 5a and inclined surfaces 5b is a baseline of the concave part. A flat part 6 is additionally provided between adjacent prisms 5.

In addition, a plurality of prisms 8 are formed as a light divider on a surface of the light-guide plate 3 disposed on a side opposite the LEDs, i.e., on a light-emitting surface 7. Two prisms 8 are formed in each area corresponding to an LED 2, and areas on the light-emitting surface 7 where no prisms 8 are formed are flat parts 9. The array direction of the prisms 8 is the X-direction, and the prisms 8 extend in the Y-direction. The prisms 8 are triangular prisms composed of a pair of inclined surfaces 8a and 8b extending in the Y-direction. As seen from the Y-direction, triangular concave parts are formed on the light-emitting surface 7. In other words, the line tangential to the inclined surface 8a and the inclined surface 8b is the baseline of the concave part. In addition, as seen from the Z-direction, four prisms 5 and two prisms 8 are disposed in the area that corresponds to a single LED 2.

The operation of the illumination device thus configured according to the present embodiment is next described. When the LEDs 2 emit light toward the light-guide plate 3, the light is incident on an area corresponding to the LEDs 2 on the light-receiving surface 4 of the light-guide plate 3. The portion of light that is incident upon the flat parts 6 between the prisms 5 travels in a substantially straight fashion with minimal change in the direction of propagation. On the other hand, light that is incident upon the inclined surfaces 5a of the prisms 5 is deflected in a direction offset from the inclined surfaces 5b that form pairs with the inclined surfaces 5a. Light that is incident on the inclined surfaces 5b is deflected in a direction offset from the inclined surfaces 5a that form pairs with the inclined surfaces 5b. In other words, light that is incident upon the light-receiving surface 4 is divided into a plurality of beams at each incident area, and is deflected in a plurality of mutually differing directions. This deflected light is entirely directed toward the light-emitting surface 7. However, a portion of the light is condensed toward a single prism

8 by a single flat part 6 and the inclined surfaces 5a and 5b disposed on both sides of the flat part 6.

Light L1 that directly reaches a flat part 9, which is part of light that reaches the light-emitting surface 7, is emitted unchanged from the flat part 9 to the outer part of the light-guide plate 3. Additionally, light L2 that is condensed by the prisms 8, which is part of light that reaches the light-emitting surface 7, is reflected by the inclined surface 8a or 8b of the prisms 8, is subsequently reflected by the flat part 9, and is then once again directed to the light-receiving surface 4. Within this light, light L2 that reaches the prisms 5 is reflected by the prisms 5 and is emitted from the light-emitting surface 7 to the outer part of the light-guide plate 3. At this time, light L2 is markedly displaced in the X-direction in the period from being reflected by the flat part 9 to reaching the prisms 5.

Furthermore, light L3 that reaches the flat parts 6 of the light-receiving surface 4, which is part of light reflected by the prisms 8 and the flat parts 9, is reflected by the flat parts 6. Light L3 is reflected by the flat parts 9 upon further reaching the flat parts 9 of the light-emitting surface 7. In this way, a portion of the light reflected by the prisms 8 is transmitted in the X-direction while repeatedly undergoing total reflection between the flat parts 6 of the light-receiving surface 4 and the flat parts 9 of the light-emitting surface 7. Upon reaching the prisms 5 of the light-receiving surface 4, the light is deflected so that the direction of propagation of the light approaches the Z-direction. When this happens, total reflection conditions are not satisfied even if the light subsequently reaches the flat parts 9 of the light-emitting surface 7, and the light is therefore emitted from the light-emitting surface 7.

The light-guide plate 3 thus transmits light emitted by the LEDs 2 in the X-direction, whereby the light is diffused in the X-direction. On the other hand, the distance between the LEDs 2 is shorter than the diffusion distance of this light. In other words, a given LED is disposed within the area on which light emitted from another LED 2 is divided, as seen from the Z-direction. The light emitted by a given LED thereby is diffused in the X-direction further than the position of the LED 2 disposed adjacent to this LED 2. As a result, the light-guide plate 3 mixes light emitted by the LEDs 2.

Figure 3:
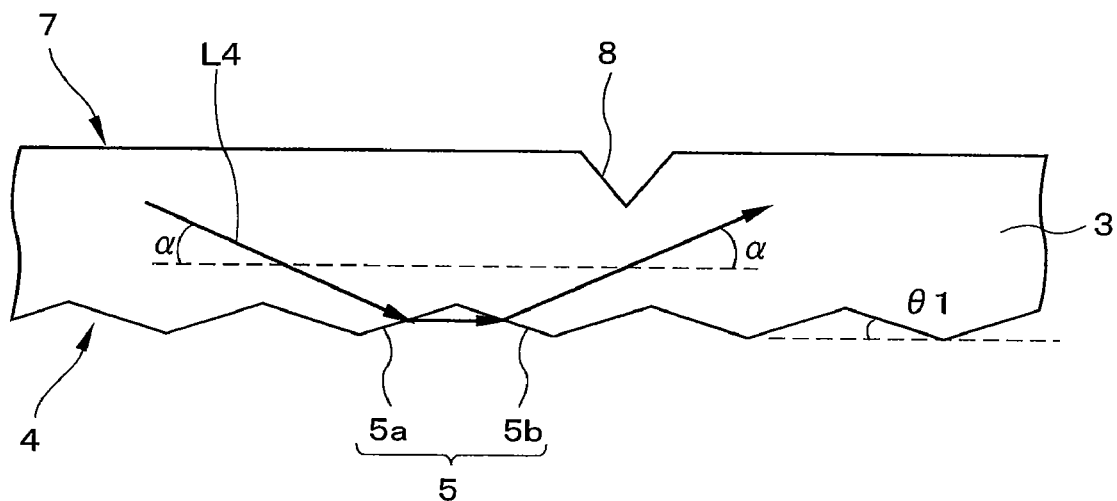
FIG. 3 is an optical model diagram showing a case in which an angle of inclination of a prism 5 satisfies a predetermined condition.
Figure 4:
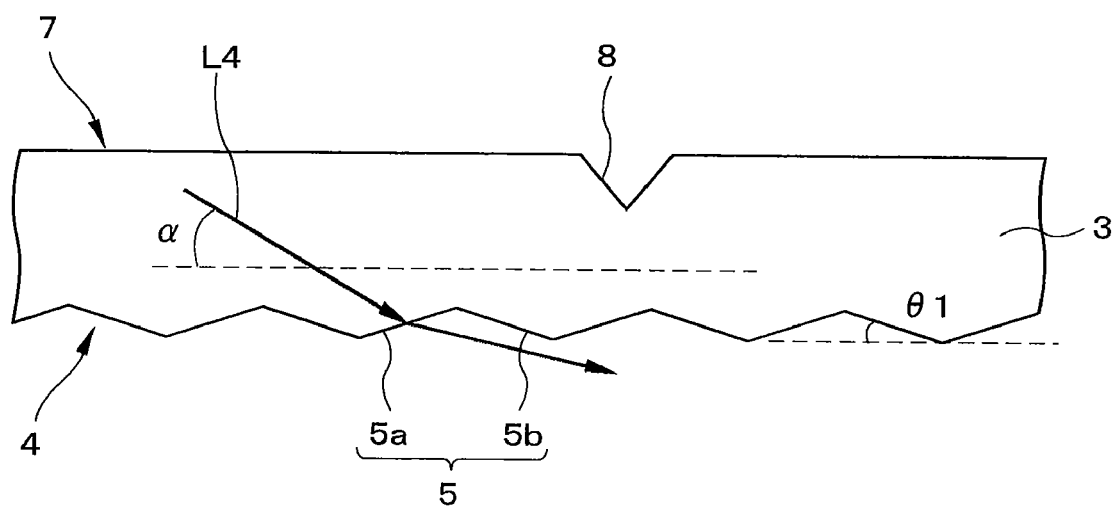
FIG. 4 is an optical model diagram showing a case in which the angle of inclination of the prism 5 does not satisfy the predetermined condition.

The angle of inclination of the prisms 5, i.e., angle θ1 formed by the inclined surfaces 5a and 5B with the X-direction, is next described. FIG. 3 is an optical model diagram showing a case in which this angle satisfies a predetermined condition. FIG. 4 is an optical model diagram showing a case in which this angle does not satisfy the predetermined condition. In FIGS. 3 and 4, the flat parts 6 of the light-receiving surface 4 are omitted.

As shown in FIG. 3, angle θ1 must satisfy Eq. 1 below, where α is the angle between the X-direction and the direction of propagation of light transmitted by the light-guide plate 3, and n is the index of refraction of the light-guide plate 3. The reason is that when light L4 transmitted within the light-guide plate 3 has reached the inclined surfaces 5a of the prisms 5, light L4 is temporarily emitted to the outer part of the light-guide plate 3 via the inclined surfaces 5a, is then redirected into the light-guide plate 3 via the inclined surfaces 5b, and is subsequently transmitted in a direction inclined to the X-direction by angle α.

$$\theta 1 = 90 - \tan^{-1}\left(\frac{\sin\alpha}{\cos\alpha - \frac{1}{n}}\right) \quad \text{[Equation 1]}$$

When angle θ1 satisfies Eq. 2 below, as shown in FIG. 4, light L4 that has reached the inclined surfaces 5a is not redirected into the light-guide plate 3, but rather is emitted toward the LEDS 2 (see FIG. 2), and is not used effectively.

$$\theta 1 > 90 - \tan^{-1}\left(\frac{\sin\alpha}{\cos\alpha - \frac{1}{n}}\right) \quad \text{[Equation 2]}$$

Therefore, angle θ1 must satisfy Eq. 3 below.

$$\theta 1 \leq 90 - \tan^{-1}\left(\frac{\sin\alpha}{\cos\alpha - \frac{1}{n}}\right) \quad \text{[Equation 3]}$$

In addition, light L4 is transmitted in the light-guide plate 3, and consequently must undergo total reflection by the flat surfaces 6 and 9. For this reason, angle α must satisfy Eq. 4 below.

$$\alpha < 90 - \sin^{-1}\left(\frac{1}{n}\right) \quad \text{[Equation 4]}$$

In actuality, light emitted by the LEDs 2 widens in a constant range of angles, and the angle of light incident from the LEDs 2 to the light-guide plate 3 is therefore also distributed in a constant range. Therefore, there is a range of values for angle α. For this reason, angle α is preferably kept at the maximum value that satisfies Eq. 4, and angle θ1 is preferably determined by Eq. 3. Also, taking into account the surface reflection of light emitted by the LEDs 2 and incident on the light-guide plate 3, angle θ1 preferably is less than, for example, 40 degrees.

Figure 5A:
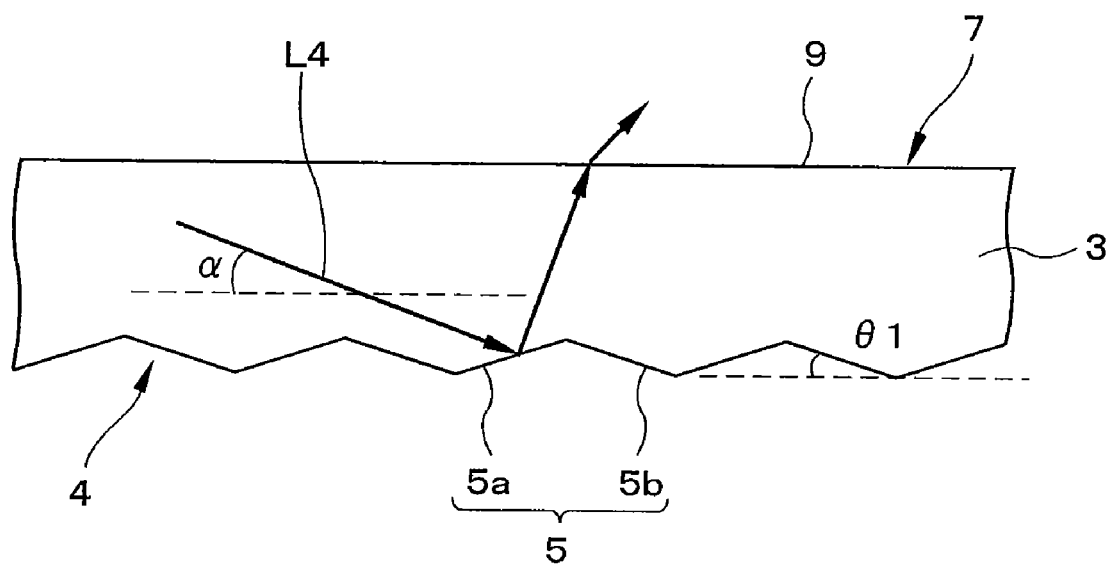
FIGS. 5A and 5B are optical model diagrams showing a case in which the angle of inclination of the prism 5 satisfies a predetermined condition.
Figure 5B:
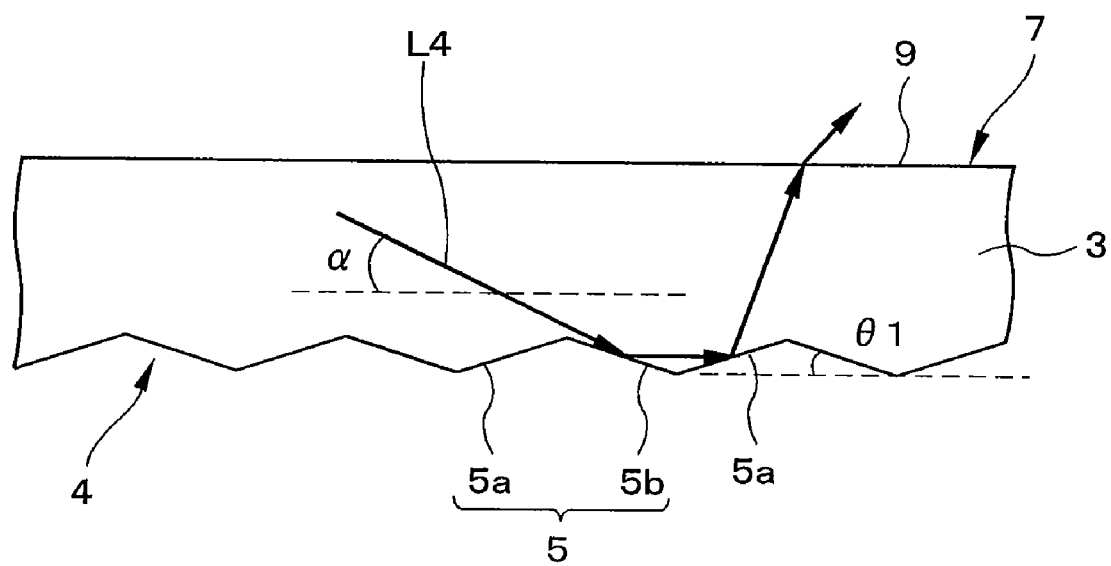

The following is a description of an angle θ1 at which light transmitted by the light-guide plate 3 is reflected by the prisms 5 and is then emitted from the light-emitting surface 7. FIGS. 5A and 5B are optical model diagrams showing a case in which angle θ1 satisfies a predetermined condition. In FIGS. 5A and 5B, the flat parts 6 of the light-receiving surface 4 are omitted.

As shown in FIG. 5A, light L4 that travels through the light-guide plate 3 in the direction inclined away from the X-direction toward the light-receiving surface 4 by angle α is reflected by the inclined surfaces 5a of the prisms 5, and is emitted from the flat part 9 of the light-emitting surface 7. Therefore, angle θ1 must satisfy Eqs. 5 and 6 below.

$$\alpha + \theta 1 < 90 - \sin^{-1}\left(\frac{1}{n}\right) \quad \text{[Equation 5]}$$

$$\alpha + 2 \times \theta 1 > 90 - \sin^{-1}\left(\frac{1}{n}\right) \quad \text{[Equation 6]}$$

As shown in FIG. 5B, light L4 that travels through the light-guide plate 3 in a direction inclined away from the X-direction toward the light-receiving surface 4 by angle α is reflected by the inclined surfaces 5b of the prisms 5, is further reflected by the inclined surfaces 5a, and is emitted from the flat part 9 of the light-emitting surface 7. Therefore, angle θ1 must satisfy Eqs. 7 through 9 below.

$$\alpha - \theta 1 > 0 \qquad [\text{Equation 7}]$$

$$180 - \theta 1 - \alpha < 90 - \sin^{-1}\left(\frac{1}{n}\right) \qquad [\text{Equation 8}]$$

$$180 - \alpha > 90 - \sin^{-1}\left(\frac{1}{n}\right) \qquad [\text{Equation 9}]$$

To summarize, in the area where light transmitted in the X-direction is designed to be emitted from the light-emitting surface 7, angle θ1 must satisfy Eq. 3 and 4, and must further satisfy at least one set of equations selected from a set that includes Eqs. 5 and 6 as well as a set that includes Eqs. 7 through 9. For example, in the area of the light-guide plate 3 on which light from the LEDs 2 is not directly incident, light transmitted from other areas must be emitted, and the above-mentioned conditions must therefore be satisfied.

On the other hand, in cases in which there is light that is incident from the LEDs 2 and is emitted from the light-emitting surface 7 without being reflected even once in the light-guide plate 3 in an area on which light from the LEDs 2 is directly incident, light transmitted from other areas will not always have to be emitted, and angle θ1 will not always have to satisfy the above conditions, as is the case with light L1 shown in FIG. 1. In this case, angle el in the area where light from the LEDs 2 is directly incident is preferably set to a value that is smaller than a value that satisfies the above-described conditions, taking into account reflection from the light-receiving surface 4.

Figure 6A:
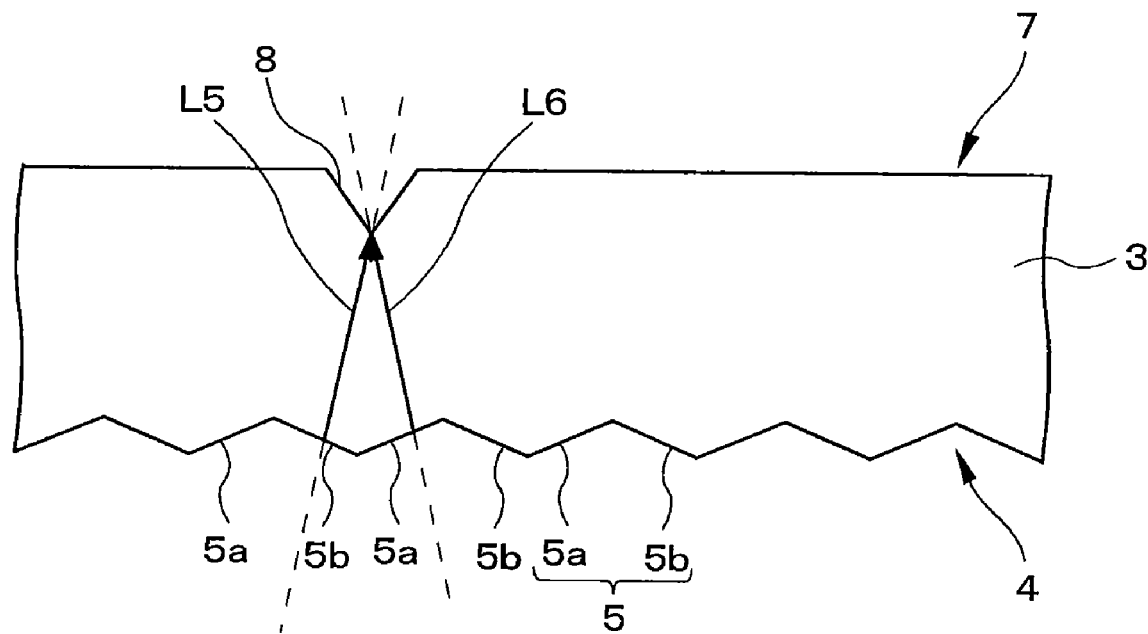
Figure 6B:
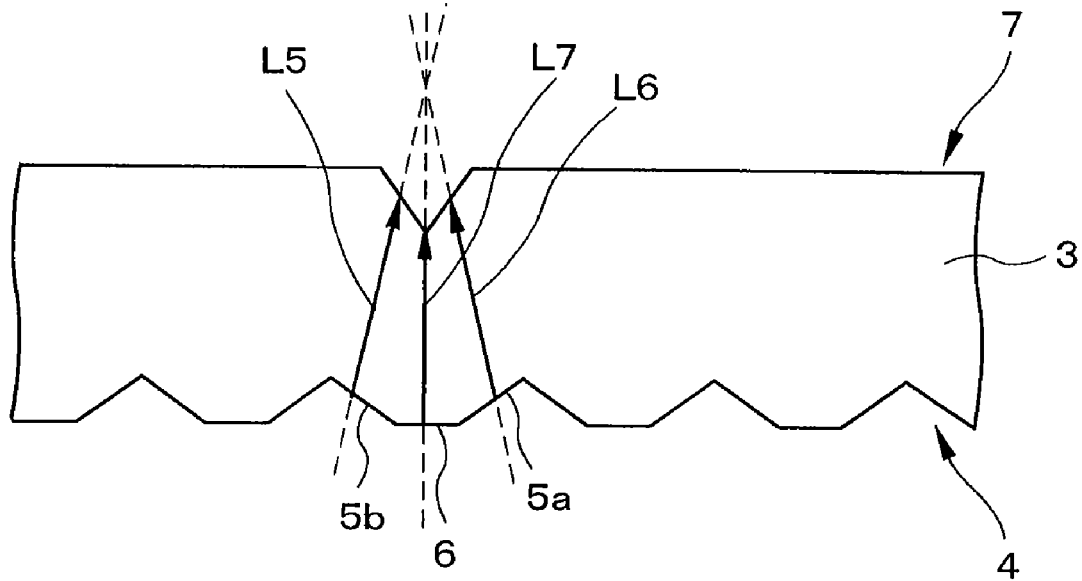

The operation of the flat parts 6 provided on the light-receiving surface 4 is next described. FIGS. 6A and 6B are optical model diagrams showing an operation in which light emitted by the LEDs is deflected by the prisms 5 and is then condensed by the prisms 8 in the present embodiment. FIG. 6A shows a case in which flat parts are provided, and FIG. 6B shows a case in which flat parts are not provided. As shown in FIG. 6A, when flat surfaces are provided between the prisms 5, the light condensed by the prisms 8 is light L5 deflected by the inclined surface 5b of one prism 5, and light L6 deflected by the inclined surface 5a of the prism 5 adjacent to this prism 5.

In contrast, when the flat parts 6 are provided between the prisms 5, light L7 incident from the flat parts 6 is also condensed by the prisms 8 in addition to the abovementioned light L5 and L6, as shown in FIG. 6B. The angular distribution of light condensed by the prisms 8 is thereby made narrow, i.e., a distribution is created in which the central is higher than the peripheral parts, and the light angle can be readily controlled. As a result, the utilization efficiency of the light, i.e., the percentage of light emitted from the light-emitting surface 7 versus the amount of light incident from the LEDs, is improved. Also, providing flat parts 6 on the light-receiving surface 4 allows total reflection to be repeated between the flat parts 6 of the light-receiving surface 4 and the flat parts 9 of the light-emitting surface 7, light L3 that propagates through the light-guide plate 3 to be generated, and the light to be transmitted far in the X-direction.

Figure 7:
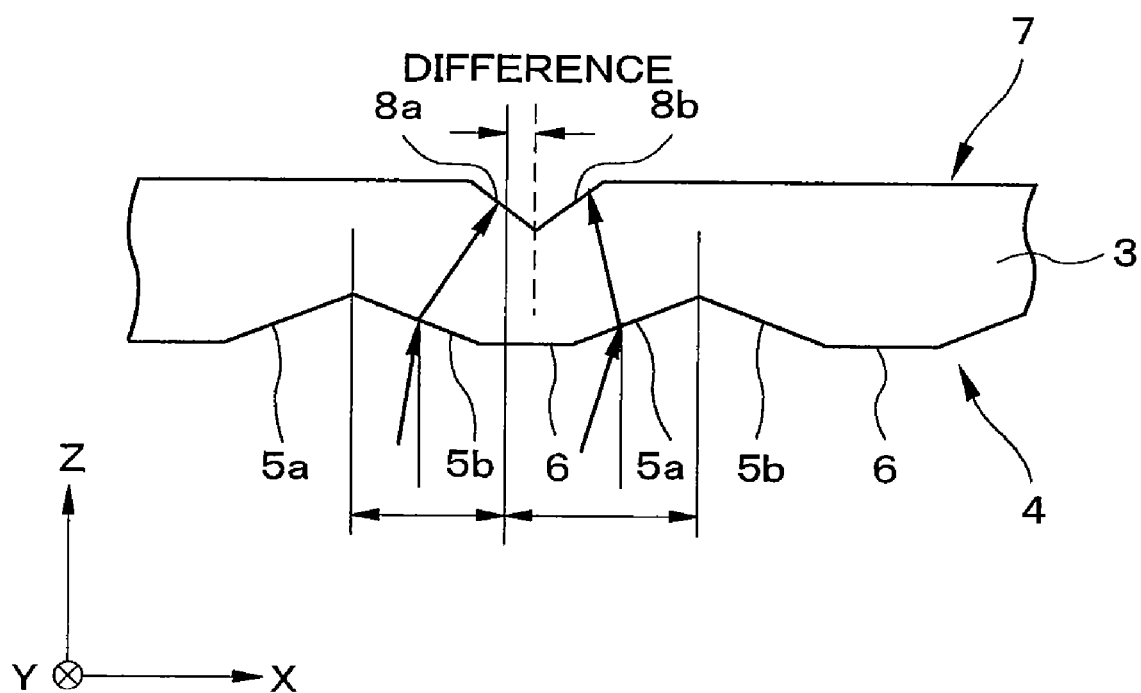
FIG. 7 is an optical model diagram showing the operation of the prisms 8 in the present embodiment.
Figure 8:
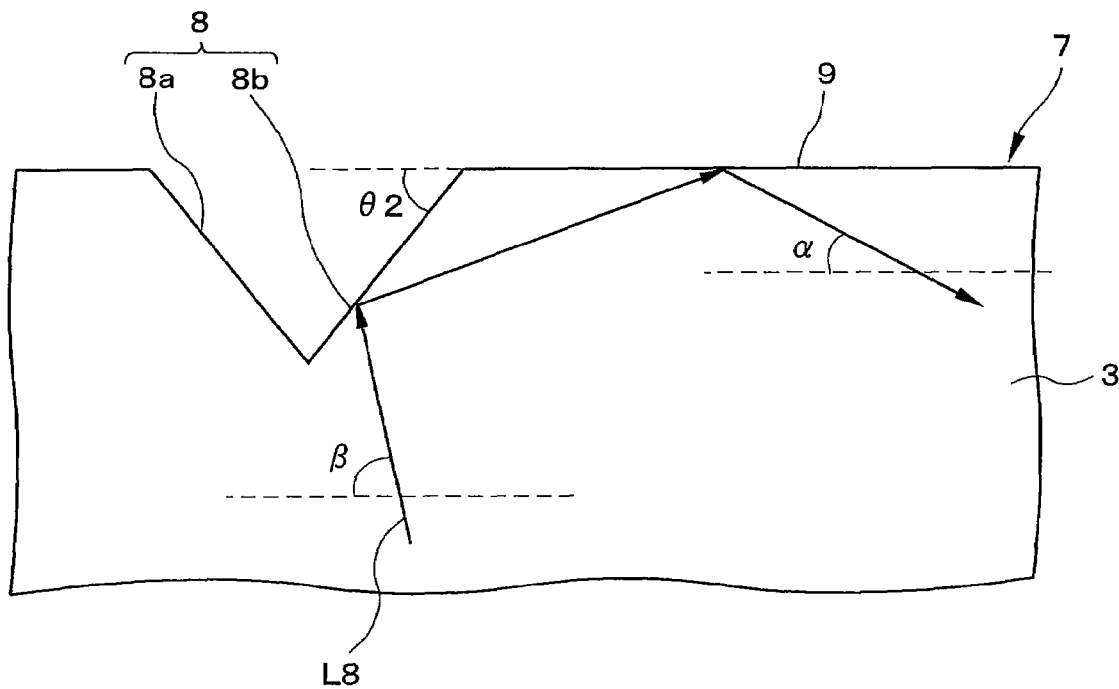
FIG. 8 is an optical model diagram showing the operation of the prisms 8 in the present embodiment.
Figure 9:
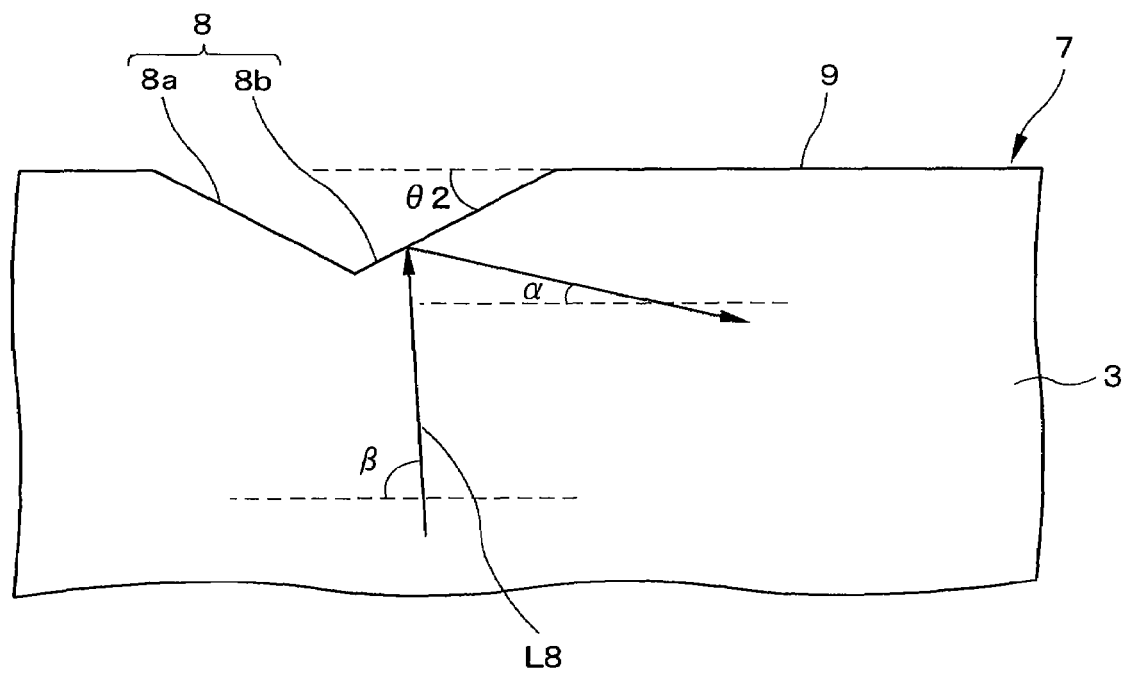
FIG. 9 is an optical model diagram showing the operation of the prisms 8 in the present embodiment.

The positions and shapes of the prisms 8 of the light-emitting surface 7 are described next. FIGS. 7 through 9 are optical model diagrams showing the operation of the prisms 8 of the present embodiment. In general, the direction of propagation of light incident from the LEDs 2 (see FIG. 1) does not match the Z-direction, and the direction of propagation of light incident on the inclined surfaces 5a and 5b, which are disposed on both sides of the flat parts 6, is completely different from the Z-direction, as shown in FIG. 7. The light incident on a given flat part 6 and on the inclined surfaces 5a and 5b on both sides thereof is therefore not necessarily condensed at a position corresponding to the center point between the inclined surfaces 5a and the inclined surfaces 5b on the light-emitting surface 7. Therefore, light is not necessarily condensed by the prisms 8 with high efficiency by placing the center of the prisms 8 at a position that corresponds to the center point between the inclined surfaces 5a and the inclined surfaces 5b, as seen from the Z-direction. The position of the prisms 8 in the X-direction must be one in which the light deflected by the flat parts 6 and by the inclined surfaces 5a and 5b on both sides of the flat parts is received with maximum efficiency, based on the angular distribution of light emitted by the LEDs 2, the positional relationship between the LEDs 2 and prisms 5, and the angle of inclination θ1 of the prisms 5. Such a position is generally offset from the position corresponding to the center points between the inclined surfaces 5a and the inclined surfaces 5b.

The angle of inclination of the prisms 8 is next described. First, a case will be described in which light L8 directed by the light-receiving surface 4 toward the light-emitting surface 7 is reflected by the inclined surfaces 8b of the prisms 8, then reflected by the flat surfaces 9, and subsequently transmitted toward the light-receiving surface 4, as shown in FIG. 8. Eq. 10 below can be written. In the equation, the angle of inclination θ2 of the prisms 8 is the angle formed by the inclined surfaces 8a and 8b with respect to the X-direction, angle β is the angle formed by the direction of propagation of light L8 with respect to the X-direction, angle α is the angle formed by the direction of propagation of light reflected by the prisms 8 and the flat parts 9 with respect to the X-direction, and n is the index of refraction of the light-guide plate 3.

$$\theta 2 = \frac{\alpha - \beta + 180}{2} \qquad [\text{Equation 10}]$$

On the other hand, Eqs. 11 and 12 below can be written for a case in which light reflected by the inclined surfaces 8b of the prisms 8 is transmitted without modification toward the light-receiving surface, as shown in FIG. 8B.

$$\theta 2 = \frac{180 - \alpha - \beta}{2} \qquad [\text{Equation 11}]$$

$$180 - \theta 2 - \beta < 90 - \sin^{-1}\left(\frac{1}{n}\right) \qquad [\text{Equation 12}]$$

Therefore, angle θ2 must satisfy at least one condition selected from two alternatives: Eq. 10 or Eqs. 11 and 12. Angle α must also satisfy Eq. 4.

The effect of the present embodiment is next described. In the present embodiment, the prisms 8 are provided on the light-emitting surface 7 of the light-guide plate 3, and light directed from the light-receiving surface 4 into the light-guide plate 3 is therefore divided in the X-direction. Light emitted by the LEDs 2 can thereby be dispersed in the X-direction. At this time, a plurality of mutually differing light paths are formed in the light-guide plate 3, and light emitted by the LEDs 2 can therefore be uniformly diffused, as exemplified by light L1 through L3 in FIG. 1.

In addition, the distance between the LEDs 2 is shorter than the diffusion distance of the light. Light emitted by the LEDs 2 is therefore uniformly mixed. Therefore, irregularities do not occur in the light emitted from the light-guide plate 3 even if the characteristics of individual LEDs are nonuniform.

Furthermore, using LEDs that emit red (R), green (G), and blue (B) light as the LEDs 2 allows light of these colors to be mixed and white light to be emitted from the light-guide plate 3. An illumination device having high color reproducibility can thereby be realized.

Still further, light emitted by the LEDs can be mixed solely by the light-guide plate 3, and the illumination device 1 can therefore be manufactured compactly and inexpensively.

Still yet further, providing the prisms 5 to the light-receiving surface 4 of the light-guide plate 3 allows light incident on the light-receiving surface 4 to be divided among a plurality of areas and then condensed toward the prisms 8. The prisms 8 can thereby be reduced in size. As a result, the prisms 8 only minimally block the light transmitted by the light-guide plate 3 in the X-direction, and the utilization efficiency of the light can be improved.

Figure 10:
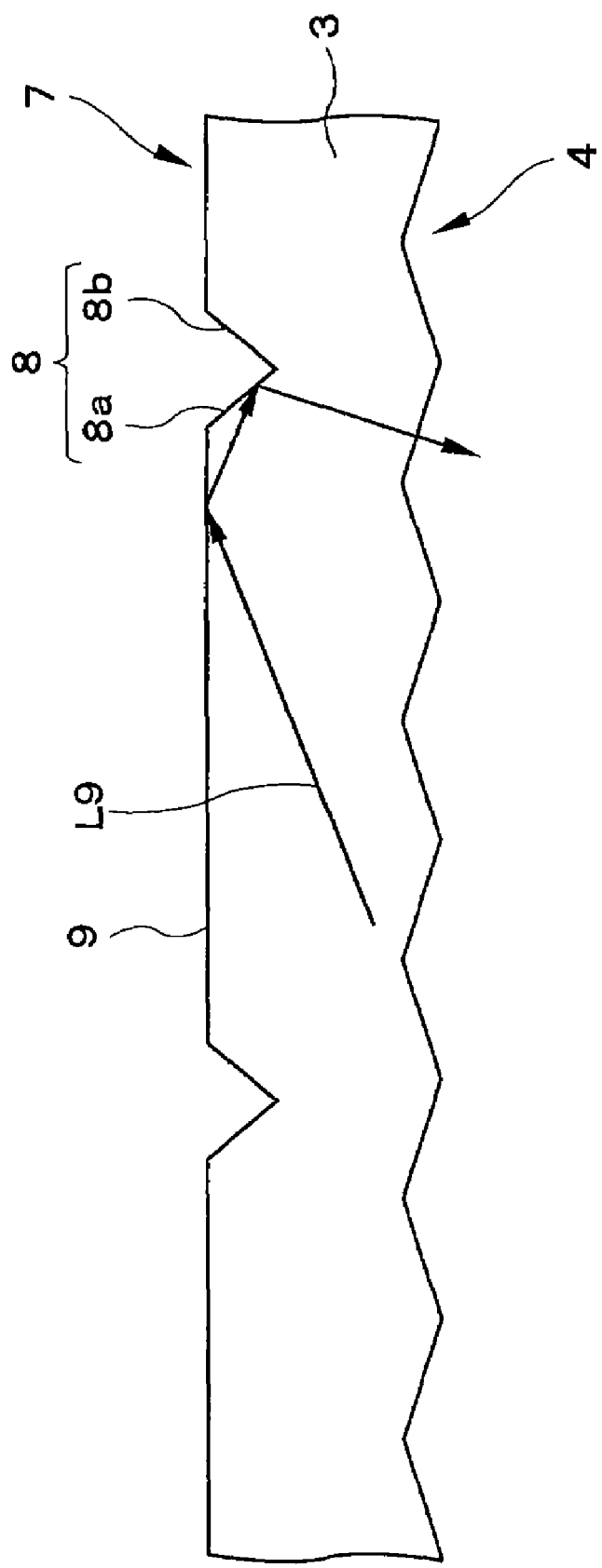
FIG. 10 is an optical model diagram showing the manner in which the device operates when light is not blocked by the prisms 8.

These effects will now be described with reference to the drawings. FIG. 10 is an optical model diagram showing the manner in which the device operates when light is blocked by the prisms 8. When light L9 transmitted by the light-guide plate 3 is reflected by the flat parts 9 of the light-emitting surface 7 and is then caused to strike the inclined surfaces 8a or 8b of the prisms 8, the light is reflected by the inclined surfaces 8a or 8b, and is directed to the light-receiving surface 4 at a steep angle, as shown in FIG. 10. When this occurs, the light is emitted from the light-receiving surface 4 to an outer portion of the light-guiding plate 3 and is not effectively used. Reducing the size of the prisms 8 as much as possible allows this loss to be minimized. Furthermore, when the angle of inclination θ1 of the prisms 5 in the area of the light-guide plate 3 on which light from the LEDs 2 is not directly incident is set to a value determined by Eqs. 1 though 9, and the angle of inclination θ1 in the area on which light from the LEDs 2 is directly incident is set to a value that is less than this value, the reflection of light on the light-receiving surface 4 is reduced in areas on which light from the LEDs 2 is directly incident, and light transmitted from other regions is emitted from the light-emitting surface 7 in areas on which light from the LEDs 2 is not directly incident. The utilization efficiency of the light can thereby be improved.

Figure 11:
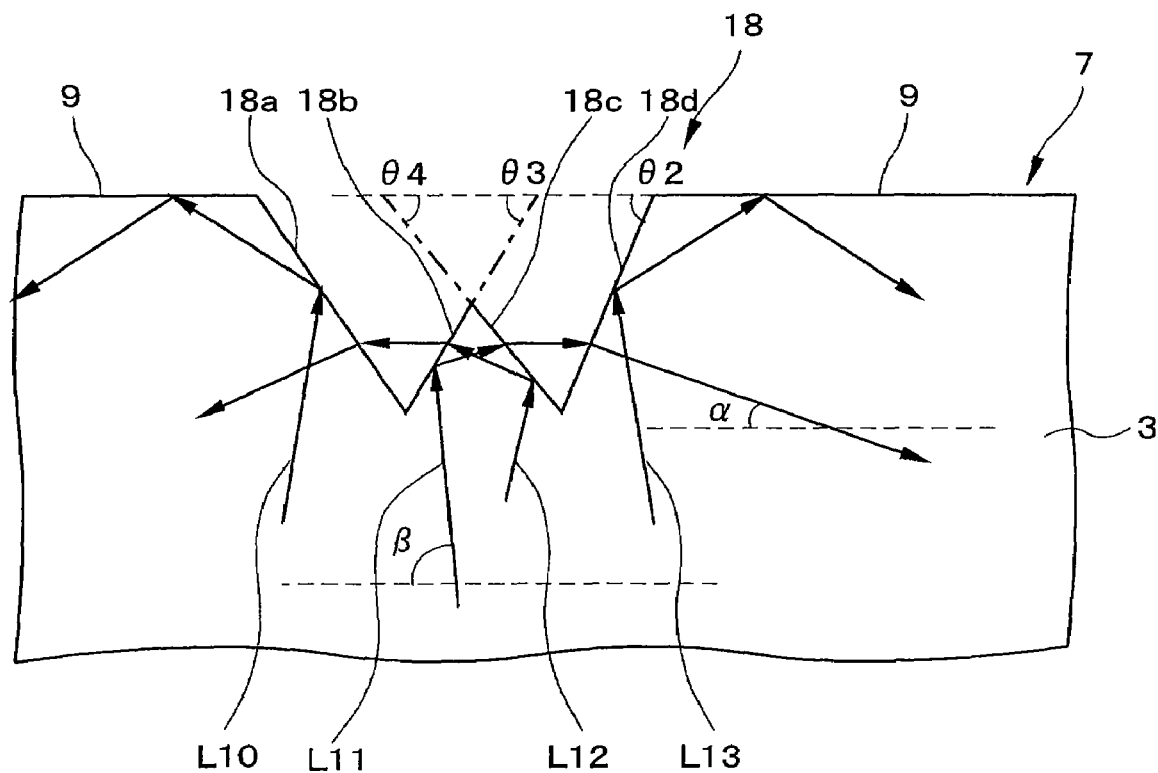
FIG. 11 is an optical model diagram showing a prism formed on a light-emitting surface of an illumination device according to a second embodiment of the present invention.

A second embodiment of the present invention is next described. FIG. 11 is an optical model diagram showing a prism 18 formed on a light-emitting surface of an illumination device according to the present embodiment. As shown in FIG. 11, the present embodiment differs from the first embodiment in that the prism 18 is provided in place of the prisms 8 (see FIG. 1). The prism 18 is a W-shaped prism obtained by superposing two triangular grooves. In other words, the prism 18 comprises four inclined surfaces 18a through 18d that extend in the Y-direction. All other aspects of the configuration of the present embodiment are identical to those of the first embodiment.

The operation of the present embodiment is next described. Light L10 incident from the light-receiving surface side on the inclined surface 18a of the prism 18 is reflected by the inclined surface 18a, is then reflected by the flat part 9, and is subsequently directed to the light-receiving surface, as shown in FIG. 11. Additionally, light L11 incident from the light-receiving surface side on the inclined surface 18b is reflected toward the inclined surface 18c by the inclined surface 18b, is then temporarily emitted from the inclined surface 18c to an outer portion of the light-guide plate 3, is subsequently redirected from the inclined surface 18d into the light-guide plate 3, and is directed toward the light-emitting surface. Furthermore, light L12 incident from the light-receiving surface side on the inclined surface 18c is reflected by the inclined surface 18c toward the inclined surface 18b, is temporarily emitted from the inclined surface 18b to an outer portion of the light-guide plate 3, is subsequently redirected from the inclined surface 18a into the light-guide plate 3, and is directed toward the light-receiving surface. Still further, light L13 incident from the receiving surface side on the inclined surface 18d is reflected by the inclined surface 18d, is then reflected by the flat surface 9, and is directed toward the light-receiving surface.

At this time, angle α is calculated by Eqs. 13 through 15 below. In these equations, β is the angle formed by the direction of propagation of light L11 with respect to the X-direction, θ3 is the angle formed by the inclined surface 18b with respect to the X-direction, θ4 is the angle formed by the inclined surface 18c with respect to the X-direction, θ2 is the angle formed by the inclined surface 18d with respect to the X-direction, and α is the angle formed by the direction of propagation of light redirected from the inclined surface 18d in disintegrate the light-guide plate 3 with respect to the X-direction. Angle α should satisfy Eq. 4.

$$\alpha = 90 - \theta2 - B \qquad \text{[Equation 13]}$$

$$B = \sin^{-1}\left\{\frac{1}{n} \times \sin(180 - A - \theta2 - \theta4)\right\} \qquad \text{[Equation 14]}$$

$$A = \sin^{-1}\left\{\frac{1}{n} \times \sin(270 - 2 \times \theta3 - \theta4 - \beta)\right\} \qquad \text{[Equation 15]}$$

Figure 12:
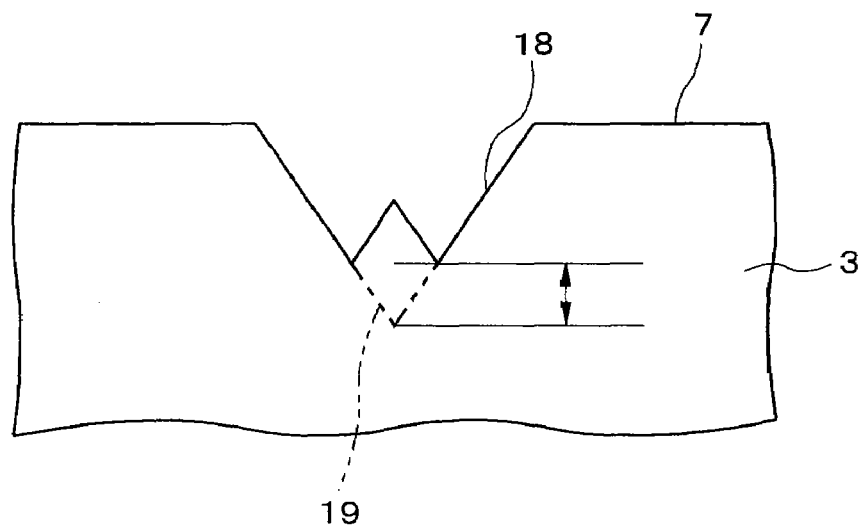
FIG. 12 is a diagram showing the effect of the present embodiment.

The effect of the present embodiment is next described. FIG. 12 is a diagram showing the effect of the present embodiment. In the present embodiment, providing the W-shaped prism 18 allows an optical effect to be realized that is equivalent to that created when a large triangle-shaped prism 19 is used, as shown in FIG. 12. The height of the prism can be reduced when compared with cases in which the prism 19 is formed. Loss of light, such as that shown in FIG. 10, can thereby be reduced. All other effects of the present embodiment are identical to those of the first embodiment.

Figure 13:
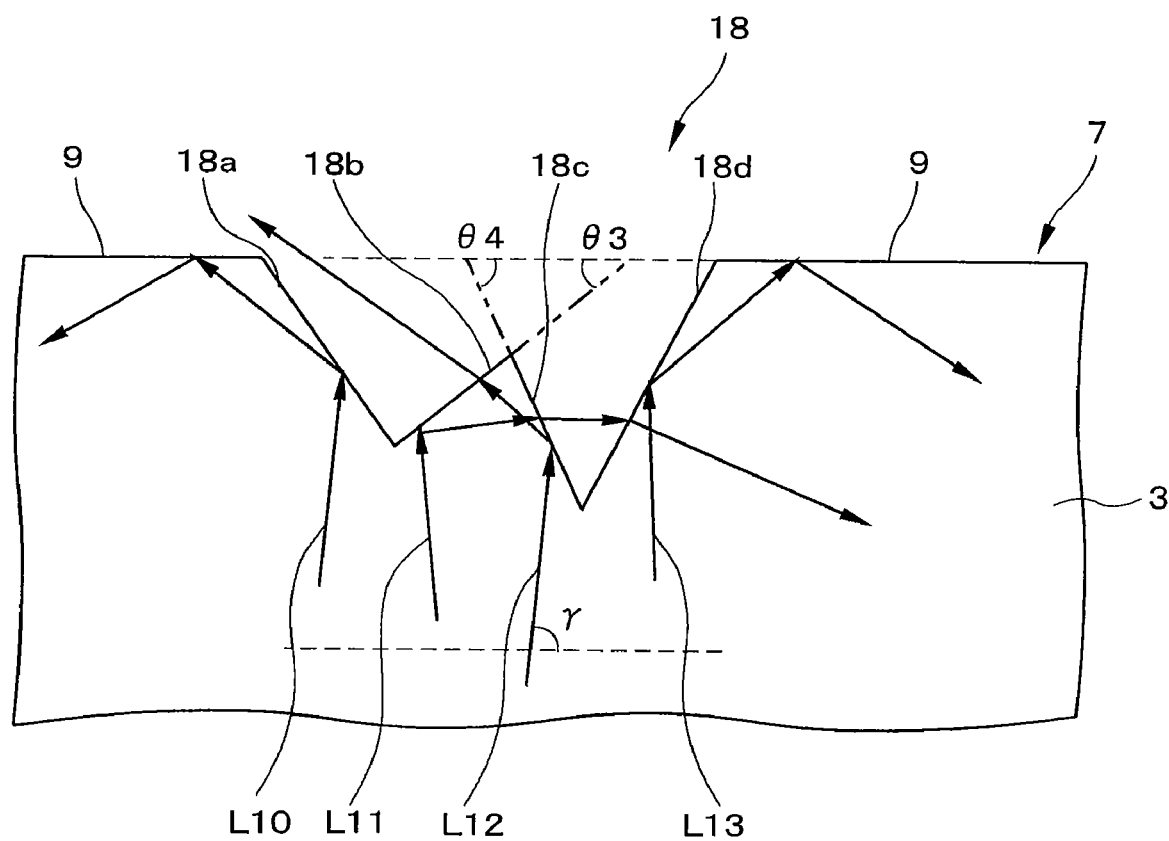
FIG. 13 is an optical model diagram showing a prism formed on a light-emitting surface of an illumination device according to a first modified example of the second embodiment.

A first modified example of the second embodiment is next described. FIG. 13 is an optical model diagram showing a prism 18 formed on a light-emitting surface of an illumination device according to the present modified example. In the present modified example, the values of angles θ3 and θ4 are different from those used in the second embodiment, as shown in FIG. 13. The configuration of the present modified example is the same as that of the second embodiment in all other respects.

The operation of the present modified example is next described. In the present modified example, light L12 incident from the light-receiving surface side on the inclined surface 18c is reflected by the inclined surface 18c of the prism 18 toward the inclined surface 18b, and is output to an outer part of the light-guide plate 3 via the inclined surface 18b, as shown in FIG. 13. The trajectories of light L10, L11, and L13 are the same as those of the second embodiment. Angle γ must satisfy Eq. 16 below, where γ is the angle formed by the direction of propagation of light L12 with respect to the X-direction.

$$270 - \theta3 - 2 \times \theta4 - \gamma > 90 - \sin^{-1}\left(\frac{1}{n}\right) \qquad \text{[Equation 16]}$$

According to the present modified example, light is also emitted to the area directly above the prism 18. Therefore, the uniformity of the emitted light is further improved when compared with the second embodiment. All other effects of the present modified example are the same as those of the second embodiment.

Figure 14:
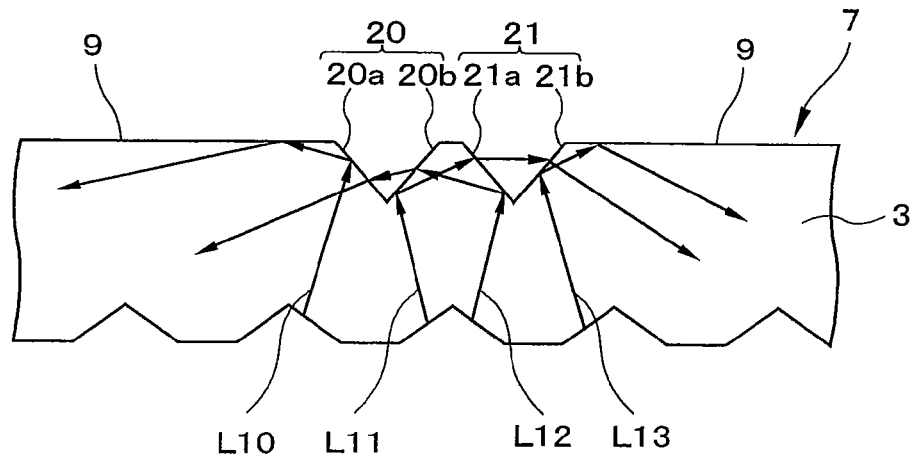
FIG. 14 is an optical model diagram showing a prism formed on a light-emitting surface of an illumination device according to a second modified example of the second embodiment.

A second modified example of the second embodiment is next described. FIG. 14 is an optical model diagram showing a prism formed on a light-emitting surface of an illumination device according to the present modified example. In the present modified example, when compared with the second embodiment, two triangular prisms 20 and 21 are provided in place of the single W-shaped prism 18, as shown in FIG. 14. The prism 20 is composed of two inclined surfaces 20a and 20b, and the prism 21 is composed of two inclined surfaces 21a and 21b. The configuration of the present modified example is the same as that of the second embodiment in all other respects.

The operation of the present modified example is next described. In the present modified example, the inclined surfaces 20a, 20b, 21a, and 21b of the prisms 20 and 21 are optically equivalent to the inclined surfaces 18a through 18d of the second embodiment, as shown in FIG. 14. In other words, the prisms 20 and 21 are a type of W-shaped prisms.

Light L10 incident from the light-receiving surface on the inclined surface 20a of the prism 20 is reflected by the inclined surface 20a, is then reflected by a flat part 9, and subsequently is directed back to the light-receiving surface. Additionally, light L11 incident from the light-receiving surface on the inclined surface 20b of the prism 20 is reflected by the inclined surface 20b toward the inclined surface 21a, is temporarily emitted from the inclined surface 21a to the outer part of the light-guide plate 3, is subsequently redirected from the inclined surface 21b into the light-guide plate 3, and is directed back to the light-receiving surface. Furthermore, light L12 incident from the light-receiving surface on the inclined surface 21a of the prism 21 is reflected by the inclined surface 21a toward the inclined surface 20b, is temporarily emitted from the inclined surface 20b to the outer part of the light-guide plate 3, is subsequently redirected from the inclined surface 3 into the light-guide plate 3, and directed back toward the light-receiving surface. Still further, light L13 incident from the light-receiving surface side to the inclined surface 21b is reflected by the inclined surface 12b, is then reflected by the flat part 9, and is directed back to the light-receiving surface.

The effect of the present modified example is next described. In the present modified example, providing two prisms 20 and 21 in the same manner as in the second embodiment allows for the same optical operation to be realized as that created when a single large prism is provided. Not providing a large prism allows the loss of light, such as that shown in FIG. 10, to be reduced. In addition, according to the present modified example, when compared with the first embodiment, the distance between prisms disposed in positions corresponding to adjacent LEDs 2 can be increased. The utilization efficiency of the light can thereby be further improved. The effect of the present modified example is the same as that of the first embodiment in all other respects.

Figure 15:
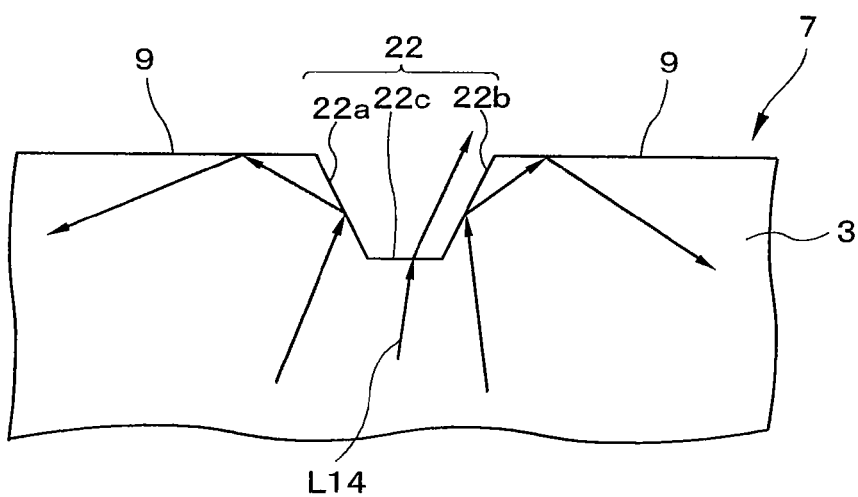
FIG. 15 is an optical model diagram showing a prism formed on a light-emitting surface of a light-guide plate in a third embodiment of the present invention.

A third embodiment of the present invention is next described. FIG. 15 is an optical model diagram showing a prism formed on a light-emitting surface of a light-guide plate according to the present embodiment. In the present embodiment, a flat part 22c is provided to the apex of a prism 22 formed on the light-emitting surface 7 of a light-guide plate 3, i.e., between inclined surfaces 22a and 22b, as shown in FIG. 15. Light L14 from the light-receiving surface side that reaches the flat part 22c of the prism 22 is thereby emitted to the outer part of the light-guide plate 3 without being reflected. As a result, light can also be emitted directly above the prism 22, and the uniformity of the emitted light can be improved. The configuration, operation, and effect of the present embodiment are the same as those of the first embodiment in all other respects.

Figure 16:
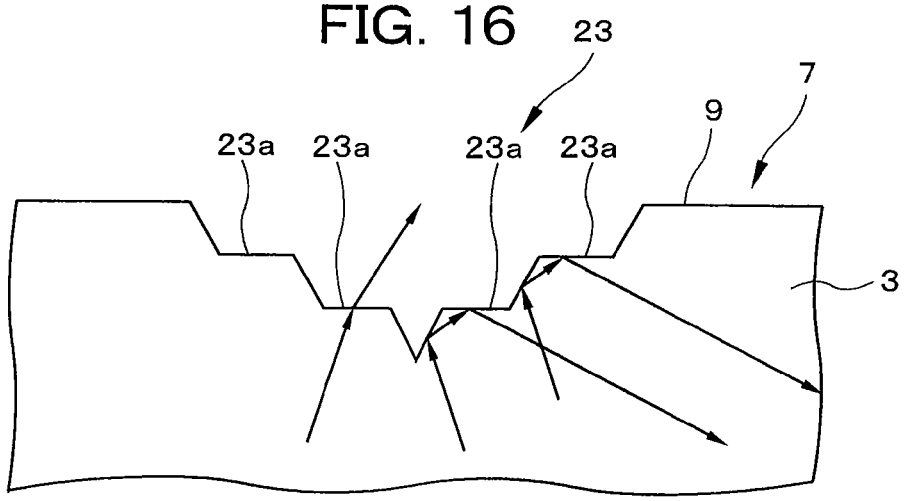
FIG. 16 is an optical model diagram showing a prism formed on a light-emitting surface of a light-guide plate of a modified example of the third embodiment.

A modified example of the third embodiment of the present invention is next described. FIG. 16 is an optical model diagram showing a prism formed on a light-emitting surface of a light-guide plate in the present modified example. In the present modified example, flat surfaces 23a are provided at two locations each on the two inclined surfaces of the prism 23 formed on the light-emitting surface 7 of the light-guide plate 3, as shown in FIG. 16. The light can thereby be emitted directly above the prism as well, and the uniformity of the emitted-light can be improved.

Figure 17:
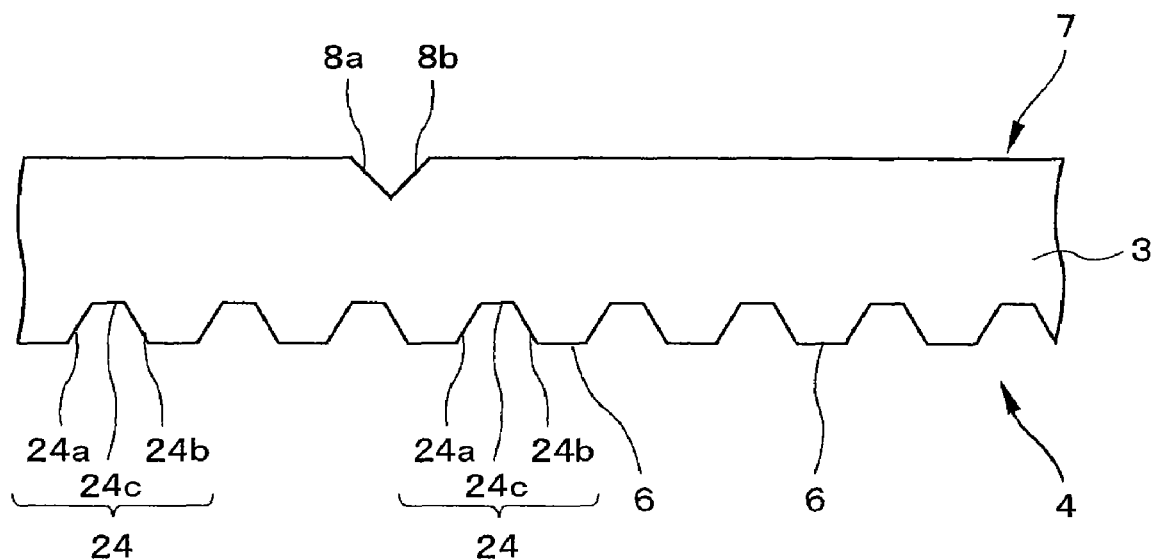
FIG. 17 is an optical model diagram showing a light-guide plate in an illumination device according to a fourth embodiment of the present invention.

A fourth embodiment of the present invention is next described. FIG. 17 is an optical model diagram showing a light-guide plate in an illumination device according to the present embodiment. In the present embodiment, when compared with the first embodiment, trapezoidal prisms 24 are provided to the light-emitting surface 4 of the light-guide plate 3 in place of the triangular prisms 5, as shown in FIG. 17. In other words, in the prisms 24, flat parts 24c are provided between inclined surfaces 24a and inclined surfaces 24b. Flat parts 6 are additionally provided between the prisms 24. A larger amount of light can thereby be transmitted in the X-direction in the light-guide plate 3. The configuration, operation, and effect of the present embodiment are the same as those of the first embodiment in all other respects.

Figure 18:
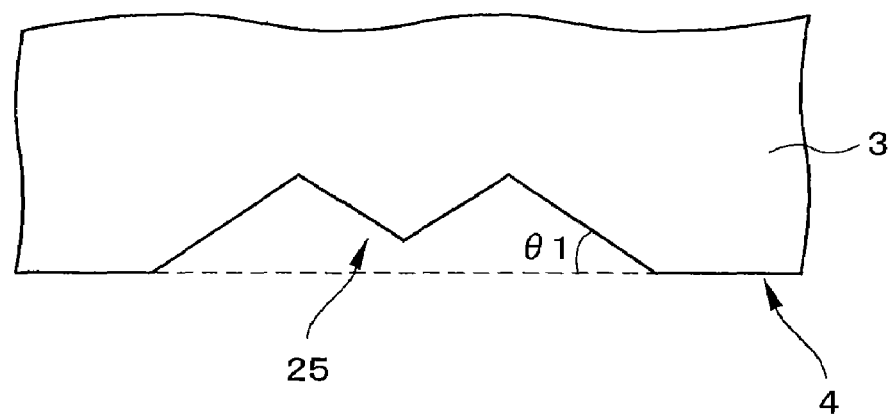
FIG. 18 is an optical model diagram showing a light-guide plate in an illumination device according to a fifth embodiment of the present invention.

A fifth embodiment of the present invention is next described. FIG. 18 is an optical model diagram showing a light-guide plate in an illumination device according to the present embodiment. As shown in FIG. 18, in the present embodiment, when compared with the first embodiment, a W-shaped prism 25 is provided to the light-emitting surface 4 of the light-guide plate 3 in place of the triangular prisms 5. The height of the prism can thereby be reduced, and more light can be propagated in the X-direction within the light-guide plate 3. The configuration, operation, and effect of the present embodiment are the same as those of the first embodiment in all other respects.

Figure 19:
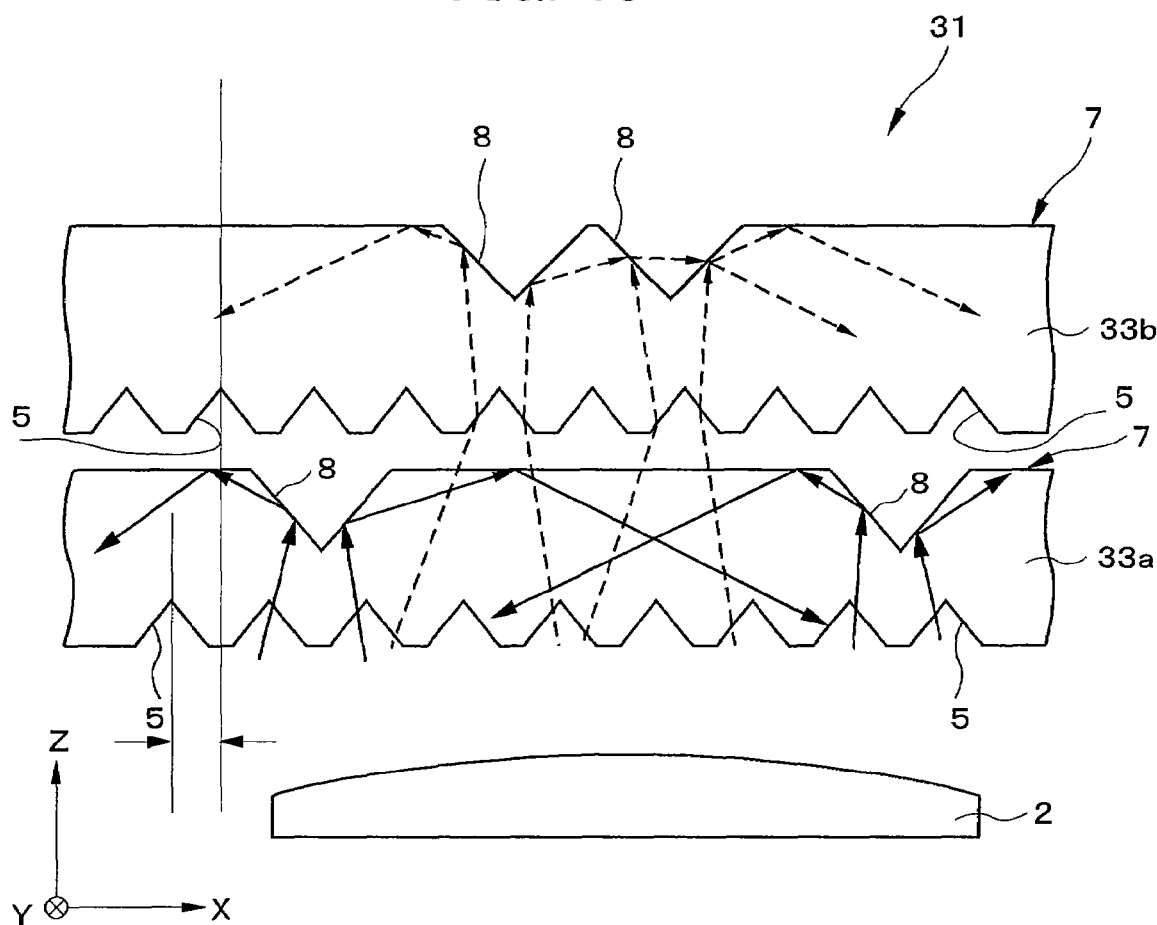
FIG. 19 is an optical model showing an illumination device according to a sixth embodiment of the present invention.
Figure 20:
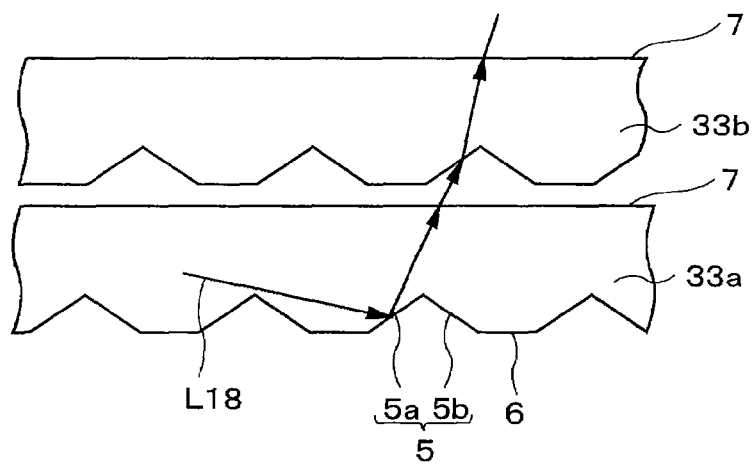
FIG. 20 is an optical model diagram showing the operation of the illumination device shown in FIG. 19.

A sixth embodiment of the present invention is next described. FIG. 19 is an optical model diagram showing an illumination device according to the present embodiment. FIG. 20 is an optical model diagram showing the operation of the illumination device. In the illumination device 31 according to the present embodiment, a plurality of LEDs 2 are arrayed along the X-direction, a first-level light-guide plate 33a is provided facing the LEDs 2, and a second-level light-guide plate 33b is provided to the side that faces the light-emitting surface of the light-guide plate 33a, as shown in FIG. 19. In other words, the LEDs 2, light-guide plate 33a, and light-guide plate 33b are arrayed in the stated order along the Z-direction. The light-guide plate 33a and light-guide plate 33b are separated from each other, and an air layer is formed between the light-guide plates.

Triangular prisms 5 are formed on the light-receiving surfaces 4 of the light-guide plates 33a and 33b in the same manner as in the light-guide plate 3 of the first embodiment. The array period of the prisms 5 formed on the light-guide plate 33a matches the array period of the prisms 5 formed on the light-guide plate 33b. As seen from the Z-direction, the array phase of the prisms 5 formed on the light-guide plate 33a does not match the array phase of the prisms 5 formed on the light-guide plate 33b and is, for example, separated by half a period.

In addition, triangular prisms 8 are formed on the light-emitting surface 7 of the light-guide plates 33a and 33b in the same manner as on the light-guide plate 3 of the first embodiment. As seen from the Z-direction, the area formed by the prisms 8 on the light-guide plate 33a and the area formed by the prisms 8 on the light-guide plate 33b are separated from each other. For example, as seen from the Z-direction, the prisms 8 formed on the light-guide body 33a are in an area that overlaps both end parts of the LED 2 in the X-direction, and the prisms 8 formed on the light-guide plate 33b are in an area that overlaps the center part of the LED 2 in the X-direction.

The operation of the illumination device according to the present invention thus configured is next described. When the LED 2 is lighted, light L18 emitted from the two end portions in the X-direction of the LED 2 is incident upon the light-guide plate 33a, is then divided by the prism 5 of the light-guide plate 33a, and is subsequently condensed by the prisms 8 of the light-guide plate 33a, as shown in FIG. 19. Light L18 is then transmitted in the X-direction in the light-guide plate 33a by the same operation as in the first embodiment, and is emitted from the light-emitting surface 7, as shown in FIG. 20. Light L18 is then directed into in the light-guide plate 33b, is deflected so that the direction of propagation approaches the Z-direction, and is thereafter emitted from the light-emitting surface 7 of the light-guide plate 33b.

On the other hand, light L19 emitted from the center of X-direction of the LEDs 2 is incident on the light-guide plate 33a, is divided and condensed by the prisms 5 of the light-guide plate 33a, and is subsequently emitted from the light-emitting surface 7 of the light-guide plate 33a. Light L19 is then incident upon the light-guide plate 33b, is divided and dispersed by the prisms 5 of the light-guide plate 33b, and reaches the prisms 8 of the light-guide plate 33b. Light L19 is next transmitted in the X-direction in the light-guide plate 33a by the same operation as in the first embodiment, and is emitted from the light-emitting surface 7 of the light-guide plate 33b.

The effect of the present embodiment is next described. As large a portion as possible of the light emitted from the LED 2 must be divided in the X-direction in order to improve the utilization efficiency of the light. However, as in the first embodiment, when as large a portion as possible of the light emitted by a single light-guide body from the LED 2 is divided in the X-direction, the size or number of the prisms 8 must be increased. However, when this is done, the proportion of the prisms 8 to the whole light-emitting surface 7 increases, and there is an increase in light loss such as that shown in FIG. 10, i.e., loss resulting from the light reflected by the flat parts 9 of the light-emitting surface being reflected by the prisms 8 and then emitted from the light-receiving surface 4, and the utilization efficiency of the light decreases. The distance between the prisms 8 decreases when the size or number of the prisms 8 is increased. Therefore, the angle of light reflected from the prisms 8 is restricted, and the dispersion distance of the light in the X-direction is reduced. This problem can be solved to some extent by making the light-guide plate 3 thicker. However, the thickness must be increased, for example, by a factor of 100% or more in order to obtain marked results, and the overall size of the illumination device will therefore increase. In contrast, a plurality of light-guide plates are provided according to the present embodiment. Therefore, the distance between the prisms 8 in the light-guide plates can be increased, the utilization efficiency of the light can be improved, and the illumination device can be made compact.

In addition, the array phase of the prisms 5 formed on the light-guide plate 33a does not match the array phase of the prisms 5 formed on the light-guide plate 33b, as seen from the Z-direction, The differences may, for example, be half a period, as shown in FIG. 19. Light L19 emitted from the central portion in X-direction the of the LED 2 is thereby first condensed by the prisms 5 of the light-guide plate 33a, is subsequently dispersed by the prisms 5 of the light-guide plate 33b, and is guided to the prisms 8 of the light-guide plate 33b. The angle of incidence of light L19 toward the prisms 8 can thereby be readily controlled, and light L19 can efficiently be used.

Furthermore, light L18 dispersed by the first-level light-guide plate 33a is deflected by the second-level light-guide plate 33b so that the direction of propagation of light L18 approaches the Z-direction, as shown in FIG. 20. It is thereby possible to reduce situations in which light L18 is reflected by the light-emitting surface 7 of the light-guide plate 33b and returned to the light-receiving surface. The light-utilization efficiency can thereby be improved.

Figure 21:
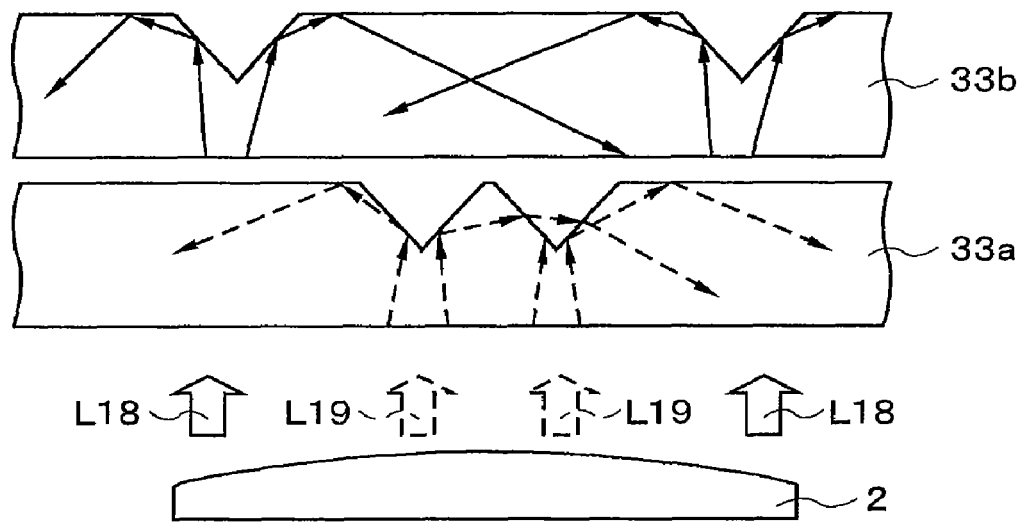
FIG. 21 is an optical model diagram showing an illumination device according to a first modified example of the sixth embodiment.

A first modified example of the sixth embodiment of the present invention is next described. FIG. 21 is an optical model diagram showing an illumination device according to the present modified example. In the present modified example, a first-level light-guide plate 33a divides light L19 emitted from the central portion in the X-direction of an LED 2, and a second-level light-guide plate 33b divides light L18 emitted from the two end portions in the X-direction of the LED 2, as shown in FIG. 21. The construction, operation, and effect of the present modified example are the same as those of the sixth embodiment in all other respects.

Figure 22:
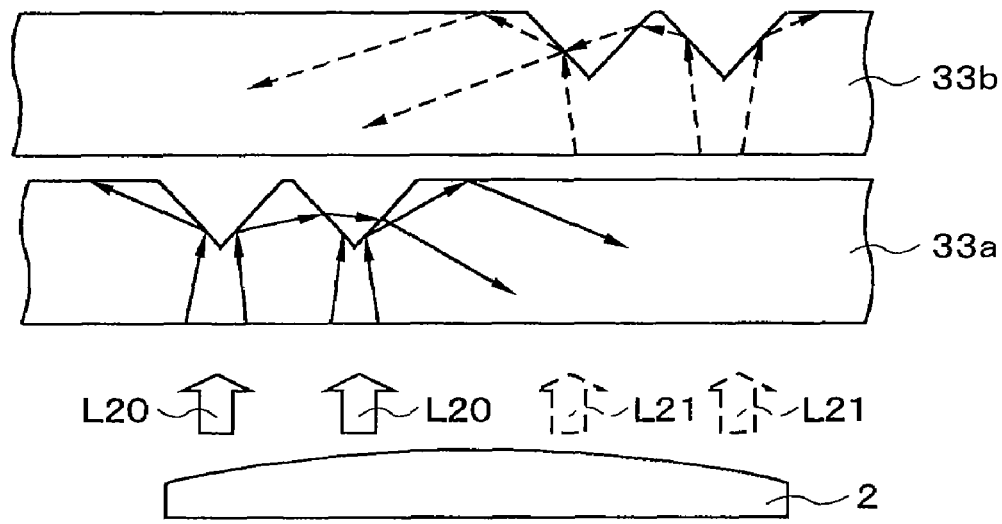
FIG. 22 is an optical model diagram showing an illumination device according to a second modified example of the sixth embodiment.

A second modified example of the sixth embodiment of the present invention is described next. FIG. 22 is an optical model diagram showing an illumination device according to the present modified example. In the present modified example, a first-level light-guide plate 33a divides light L20 emitted from one lateral portion in the X-direction of the LED 2, and a second-level light-guide plate 33b divides light L21 emitted from the other lateral portion in the X-direction of the LED 2, as shown in FIG. 22. The construction, operation, and effect of the present modified example are the same as those of the sixth embodiment in all other respects.

Figure 23:
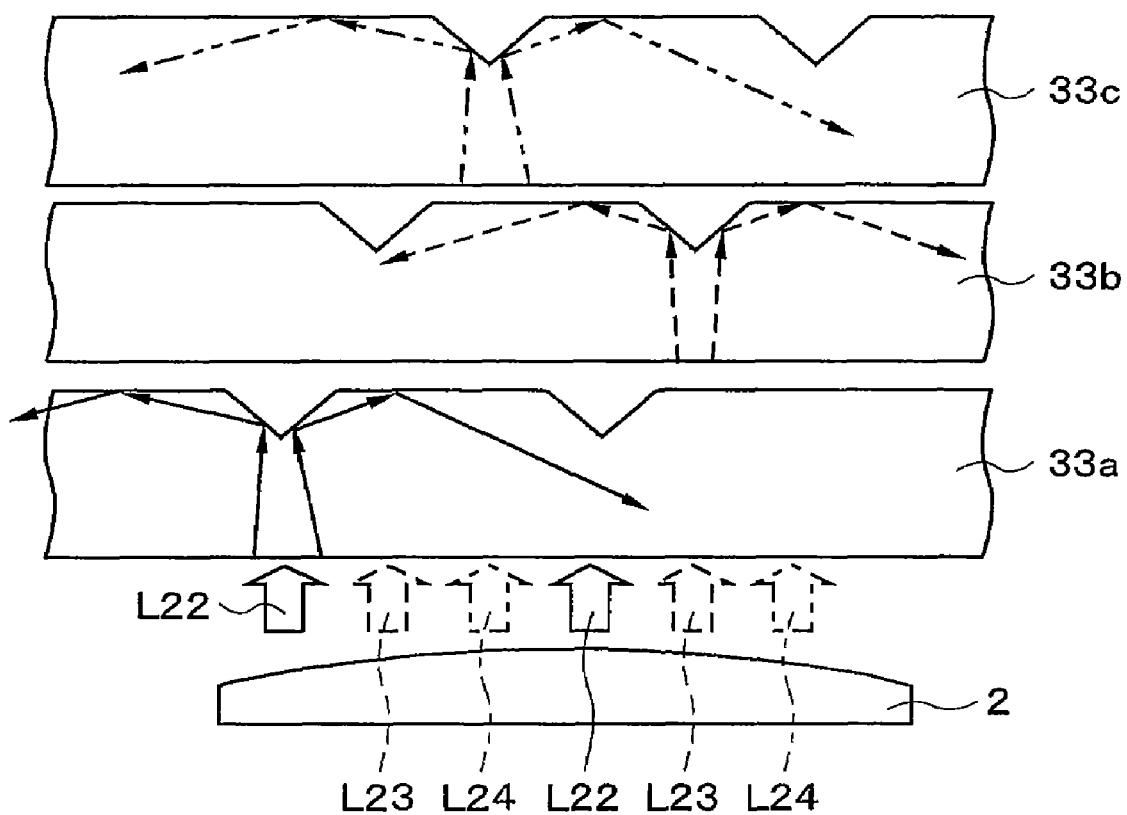
FIG. 23 is an optical model diagram showing an illumination device according to a third modified example of the sixth embodiment.

A third modified example of the sixth embodiment of the present invention is next described. FIG. 23 is an optical model diagram showing an illumination device according to the present modified example. Three light-guide plates are provided in the present modified example, as shown in FIG. 23. In other words, LEDs 2, a light-guide plate 33a, a light-guide plate 33b, and a light-guide plate 33c are arrayed in the stated order along the Z-direction. The LEDs 2 are divided into six areas along the X-direction. Light L22 and L25 emitted from the first and fourth areas, respectively, as counted from one end in the X-direction, are dispersed by the first-level light-guide plate 33a; light L23 and L26 emitted from the second and fifth areas, respectively, are dispersed by the second-level light-guide plate 33b; and light L24 and L27 emitted from the third and sixth areas, respectively, are dispersed by the third level light-guide plate 33c. The distance between the prisms 8 in the light-guide plates can thereby be further increased. The construction, operation, and effect of the present modified example are the same as those of the sixth embodiment in all other respects.

Figure 24:
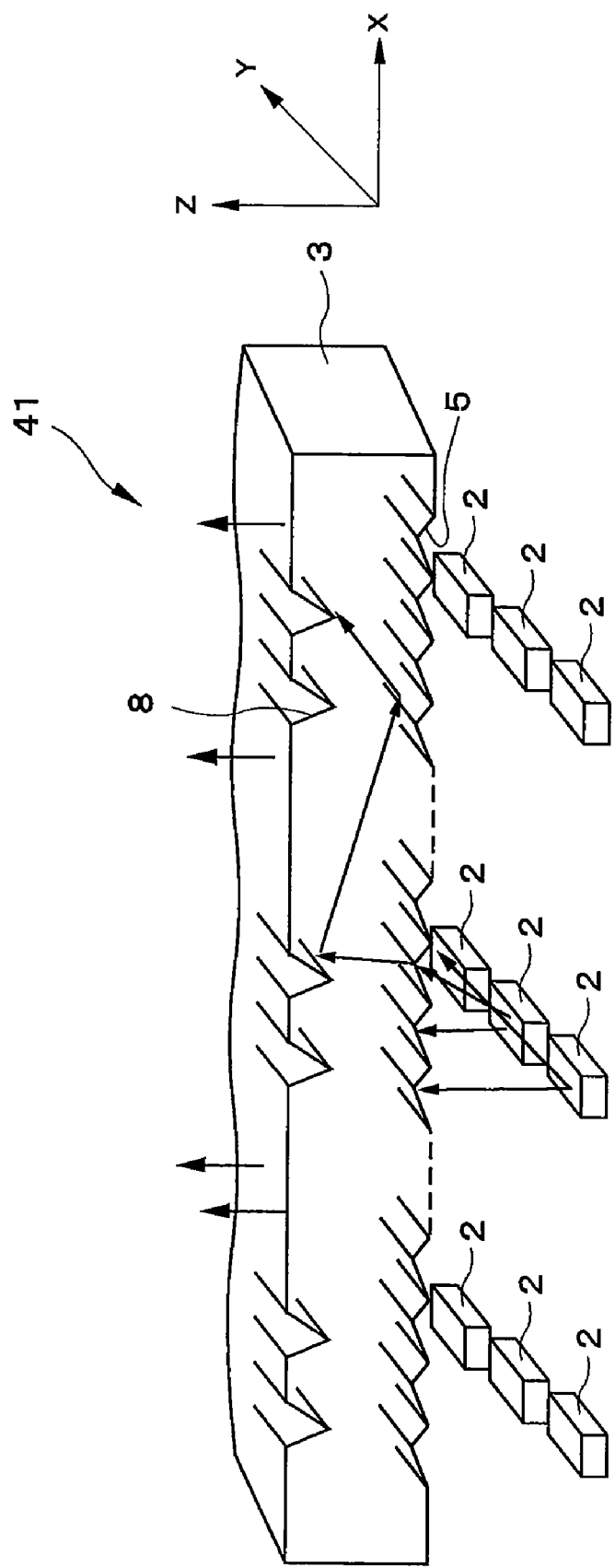
FIG. 24 is a perspective view showing an illumination device according to a seventh embodiment of the present invention.

A seventh embodiment of the present invention is next described. FIG. 24 is a perspective view showing an illumination device according to the present embodiment. In the illumination device 41 according to the present embodiment, a plurality of LEDs 2 are arrayed along the Y-direction to form a row of LEDs 2. A plurality of these rows are arrayed in the X-direction. The light from the light-emitting surface 7 of the light-guide plate 3 can thereby be emitted in a plane, and a planar illumination device can be produced. The configuration, operation, and effect of the present embodiment are the same as those of the first embodiment in all other respects.

In the present embodiment, the light-guide plate may be any of the light-guide plates used in the second through the sixth embodiments.

Additionally, in the present embodiment, a cold-cathode fluorescent lamp or another linear light source may be provided in place of the plurality of rows of LEDs 2. A planar illumination device can thereby be produced as well.

Furthermore, in the illumination devices according to the first through sixth embodiments, a planar light-guide plate may be provided on the light-emitting side of the light-guide plate. A planar light-guide plate disperses and emits incident linear light in a plane. A planar illumination device can thereby be produced as well. In this case, the light-guide plate and the planar light-guide plate are disposed at a distance from each other, and an air layer is preferably formed therebetween. A prism may also be formed on the light-receiving surface of the planar light-guide plate, and the angle of light incident on the planar light-guide plate may be controlled. In the illumination devices according to the first through sixth embodiments, a reflecting plate may further be provided to at least part of an area that excludes the side facing the light-emitting surface of the light-guide plate, which is an area that covers the LED and the light-guide plate. For example, in an illumination device having a planar light-guide plate, a reflecting plate may be provided between the LED and light-guide plate, between the light-guide plate and the planar light-guide plate, or in a portion that excludes the portion located on one side of the planar light-guide plate in the light-emission direction. The utilization efficiency can thereby be further improved.

In the first through seventh embodiments, examples were given in which prisms were formed as condensers on light-receiving surfaces of light-guide plates. Prisms readily control the angle of transmitted light, and are therefore suitably used as condensers. However, in the present invention, the condenser is not limited to being composed of prisms, and may be an optical element, i.e., a lens, having the function of dividing incident light into a plurality of portions and condensing the light toward a light divider. When a lens is used as the condenser, the angle θ1 is the angle of the surface tangential to the lens.

In addition, in the first through seventh embodiments, examples were given in which a portion of light incident on the prisms 5, which act as condensers, is condensed toward prisms (e.g. the prisms 8), which act as light dividers, and the remainder of the light is emitted from flat parts provided between the prisms. However, the entire amount of light incident on the condenser may also be condensed toward the light divider.

Furthermore, in the first through seventh embodiments, examples were given in which flat parts 6 were provided between the prisms 5 of the light-receiving surface 4 of the light-guide plate 3. However, the flat parts 6 may be omitted.

Still further, in the first through seventh embodiments, examples were given in which prisms were formed as light dividers on a light-emitting surface of a light-guide plate. Such prisms can be used as light dividers, but the present invention is not limited thereto. Any item can be used as a light divider provided that it is an optical element having the function of being able to divide incident light between areas other than the interior of a light-guide plate.

Still yet further, in the first through seventh embodiments, a dispersion sheet or dispersion plate for dispersing light to the light-emitting side of the light-guide plate may be provided. The emitted light can thereby further be made uniform.

Even further, the first through seventh embodiments can be mutually combined and operated.

An eighth embodiment of the present invention is next described. The present embodiment is an embodiment of a display device according to the present invention. In the liquid crystal display device according to the present embodiment, the planar illumination device according to the above-described seventh embodiment is provided as a backlight, and a transmissive liquid crystal panel is provided to a light-emitting side of the planar illumination device. Light emitted from the planar illumination device is incident on the liquid crystal panel and transmitted, whereby an image is displayed. A compact, inexpensive, and low-power-consuming bright display device can thereby be obtained.

EXAMPLE 1

Figure 25:
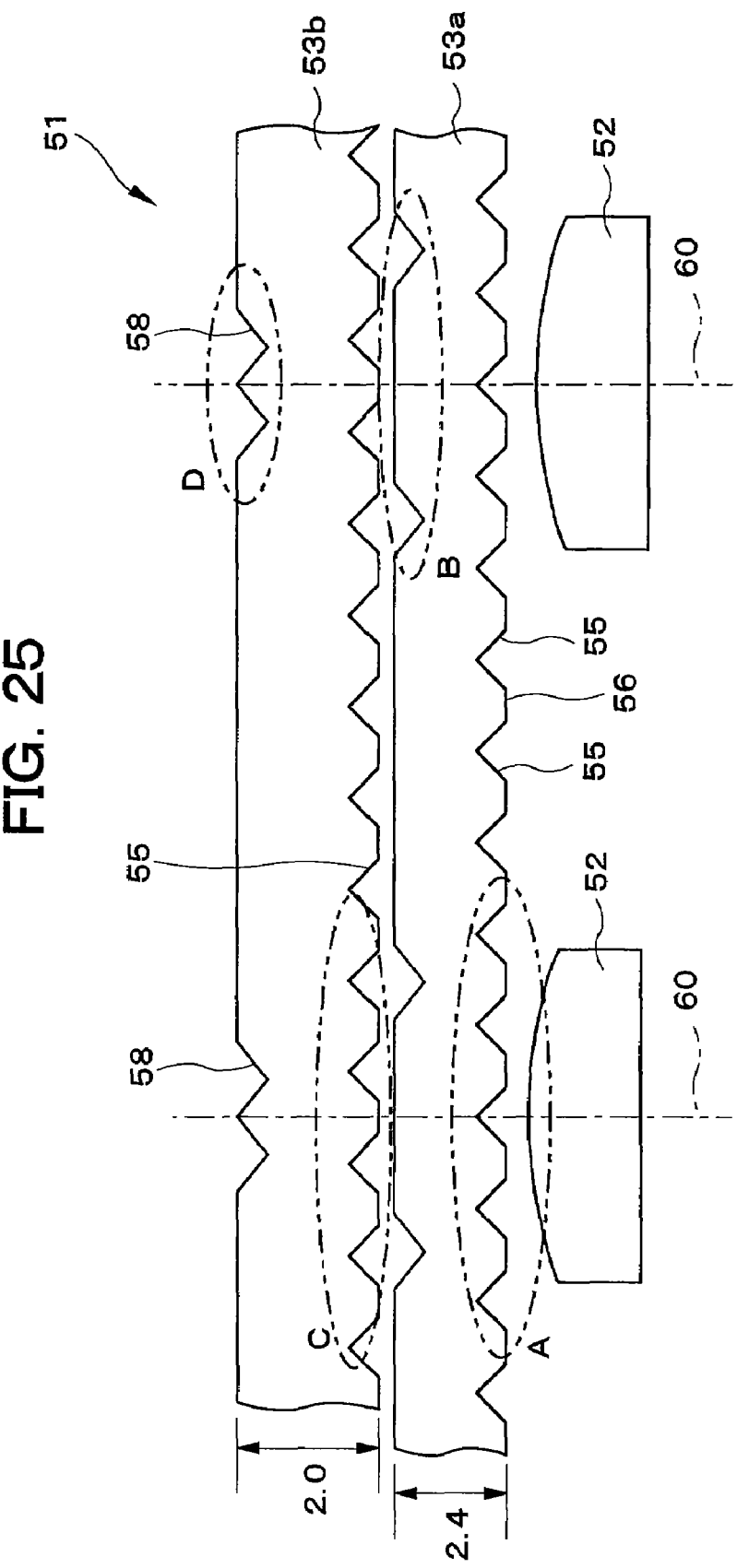
FIG. 25 is an optical model diagram showing an illumination device according to Example 1.
Figure 26:
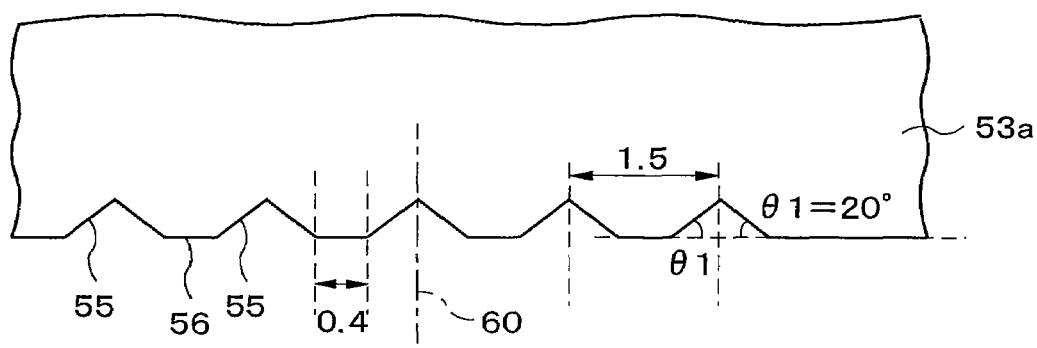
FIG. 26 is an enlarged view showing section A in FIG. 25.
Figure 27:
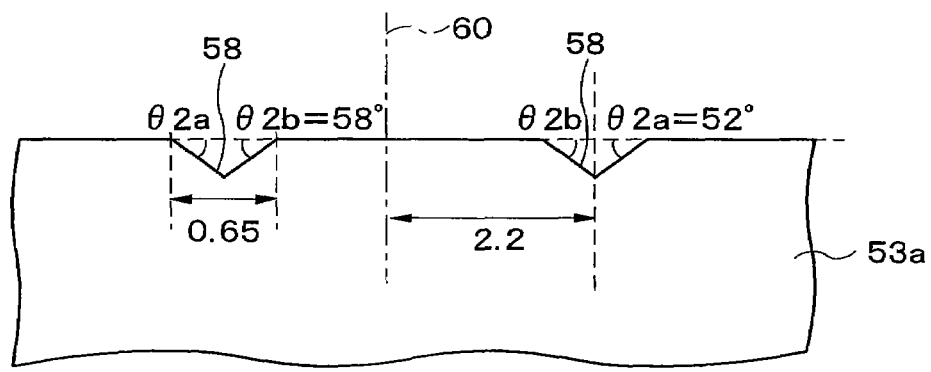
FIG. 27 is an enlarged view showing section B in FIG. 25.
Figure 28:
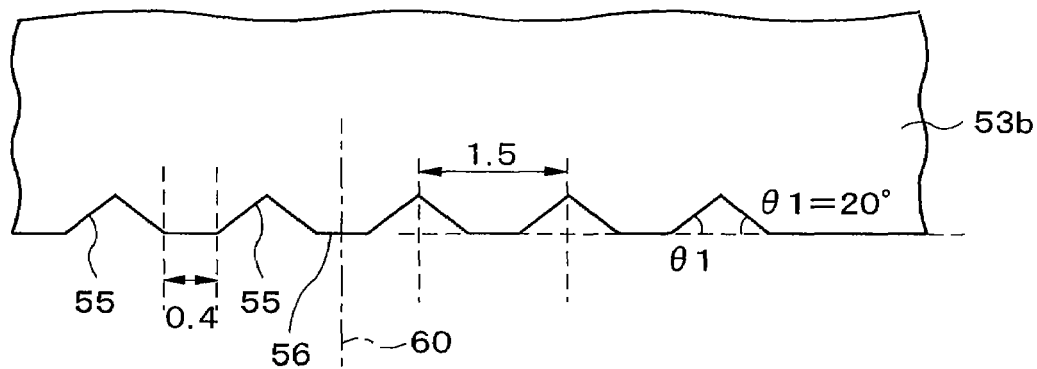
FIG. 28 is an enlarged view showing section C in FIG. 25.
Figure 29:
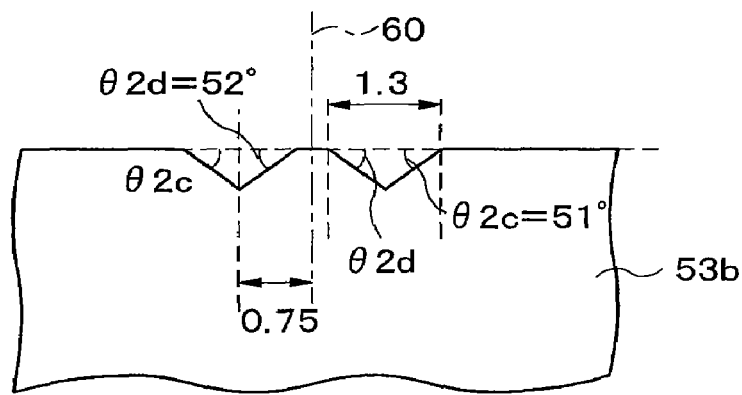
FIG. 29 is an enlarged view showing section D in FIG. 25.

Examples of the present invention are described below. Example 1 is first described. FIG. 25 is an optical model diagram showing an illumination device according to example 1; FIG. 26 is an enlarged view of section A in FIG. 25; FIG. 27 is an enlarged view of section B in FIG. 25; FIG. 28 is an enlarged view of section C in FIG. 25; and FIG. 29 is an enlarged view of section D in FIG. 25. The dimensions of each part are shown in FIGS. 26 through 29, and the unit of measurement is millimeter (mm).

In Example 1, nine white LEDs 52 were disposed at intervals of 9 mm, as shown in FIG. 25. The angle at which light was emitted by the white LEDs 52 was ±10 degrees, and the LEDs 52 had a disc-shaped outer contour having a diameter of 5 mm. Two light-guide plates 53a and 53b were disposed on the light-emitting side of the white LEDs 52. A reflecting plate (not shown) was additionally disposed in portions that excluded the light-emitting side of the light-guide plate 53b so as to cover the white LEDs 52 and the light-guide plates 53a and 53b. An illumination device 51 was thereby produced. Prisms 55 were formed at a constant period on the light-receiving surfaces of the light-guide plates 53a and 53b. A pair of prisms 58 was formed on the light-emitting surface for each of the LEDs 52 at positions symmetrical to central axes 60 of the LEDs 52. Light emitted from a single white LED 42 was thereby split into four beams, divided by the two-level light-guide plate, and made uniform.

The prisms 55 formed on the light-receiving surfaces of the light-guide plates 53a and 53b were configured so that the distance between the apexes of the prisms 55 was 1.5 mm, the length of the flat parts formed between the prisms was 0.4 mm, and the angle of inclination θ1 was 20 degrees, as shown in FIGS. 26 and 28. In addition, the light-guide plate 53a was configured so that the apexes of the prisms 55 were on the central axes 60 of the LEDs 52; and the light-guide plate 53b was configured so that the center points between the apexes of the prisms 55, i.e., the centers of the flat parts 56, were disposed on the central axes 60 of the LEDs 52.

The prisms 58 formed on the light-emitting surface of the light-guide plate 53a were configured so that the distance from the central axes 60 of the LEDs 52 to the apexes of the prisms 58 was 2.2 mm; the width of the prisms 58 was 0.65 mm; the angle of inclination θ2a of sides of the prisms 58 furthest from the central axes 60, which is one of the angles of inclination of the prisms 68, was 52 degrees; and the angle of inclination θ2b of the sides near the axes 60 was 58 degrees, as shown in FIG. 27. Furthermore, the prisms 58 formed on the light-emitting surface of the light-guide plate 53b were configured so that the distance from the central axes 60 of the LEDs 52 to the apexes of the prisms 58 was 0.75 mm; the width of the prisms 58 was 1.3 mm; the angle of inclination θ2c of inclined surfaces furthest from the central axes 60, which is one of the angles of inclination of the prisms 58, was 51 degrees; and the angle of inclination θ2b of the sides near the axes 60 was 52 degrees, as shown in FIG. 29.

Figure 30:
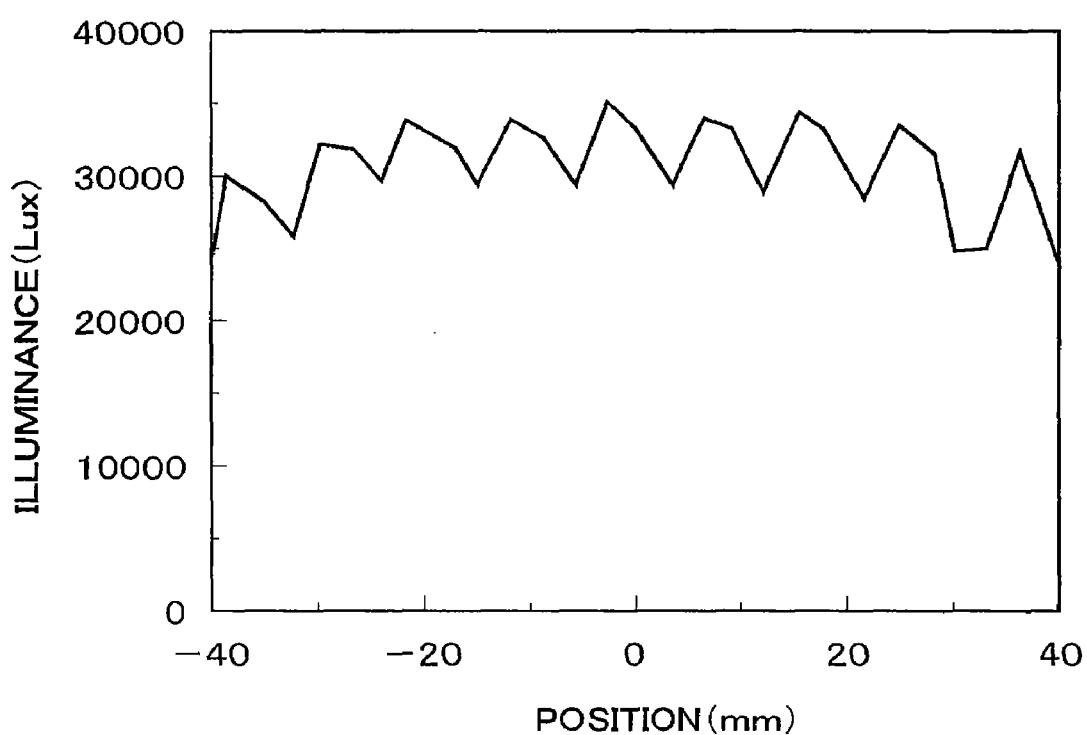
FIG. 30 is a graph showing the distribution of light emitted by the illumination device according to Example 1, where the horizontal axis shows the position of the LED in the array direction (X-direction) on the emission surface of the illumination device, and the vertical axis shows the intensity of light emitted by the illumination device.

The illumination device 51 was energized, and the light utilization efficiency and distribution of emitted light thereof were measured. FIG. 30 is a graph showing the distribution of light emitted by the illumination device according to example 1, where the horizontal axis shows the position of the LED in the array direction (X-direction) on the emission surface of the illumination device, and the vertical axis shows the intensity of light emitted by the illumination device. The center of the centrally located white LED 52, which is one of the nine white LEDs 52, is designated as "0 mm" on the horizontal axis in FIG. 30. The light-utilization efficiency of the illumination device was 77.1%. In addition, the distribution of emitted light was uniform, as shown in FIG. 30.

EXAMPLE 2

Figure 31:
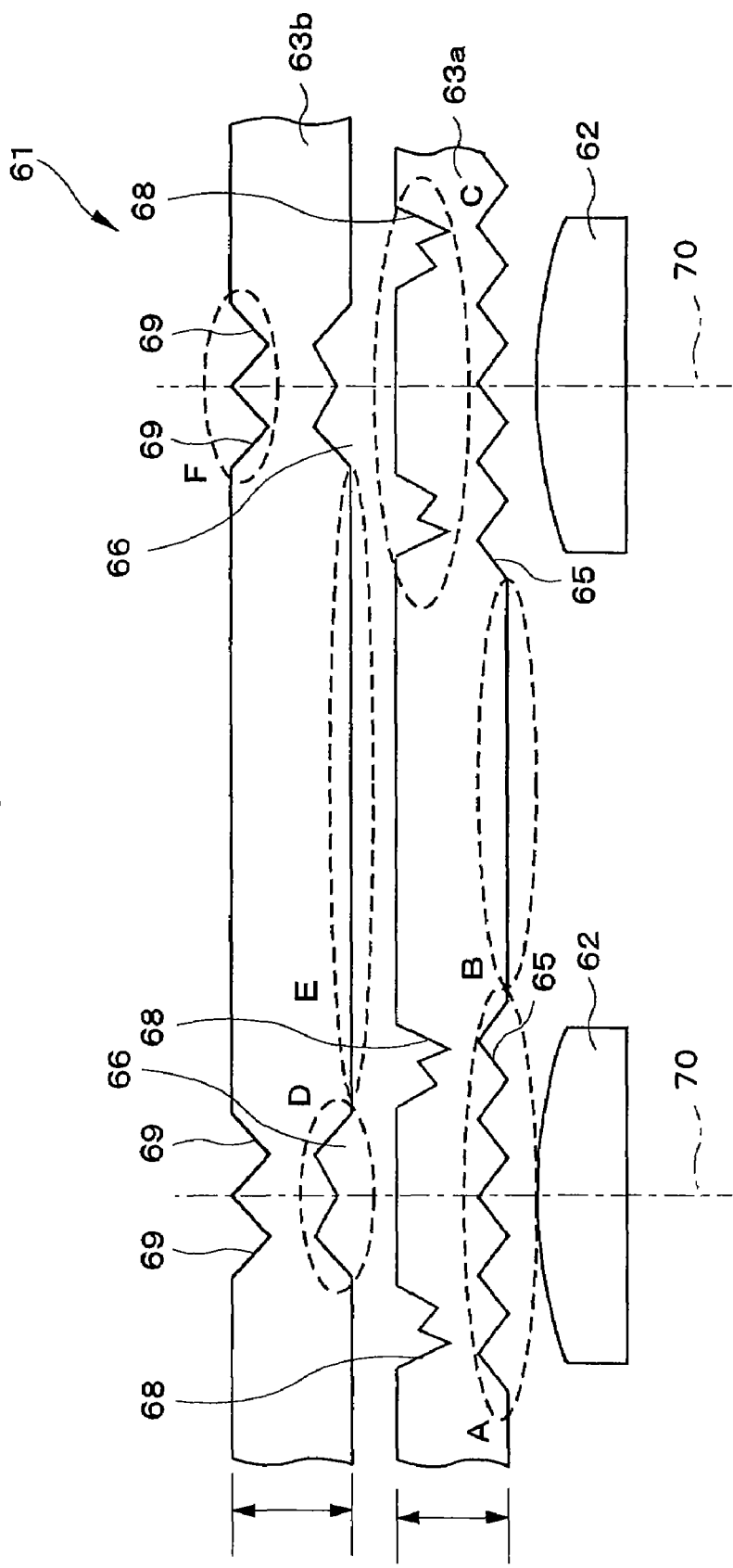
FIG. 31 is an optical model diagram showing the illumination device according to Example 2.
Figure 32:
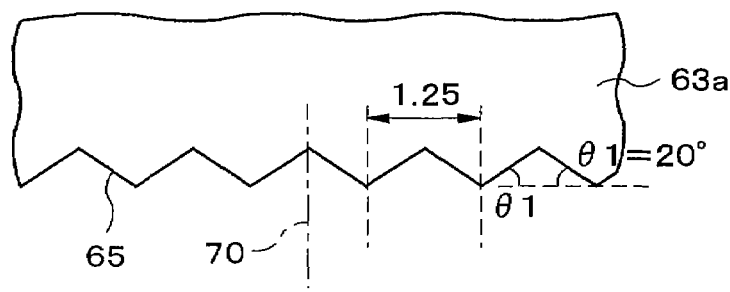
FIG. 32 is an enlarged view showing section A in FIG. 31.
Figure 33:
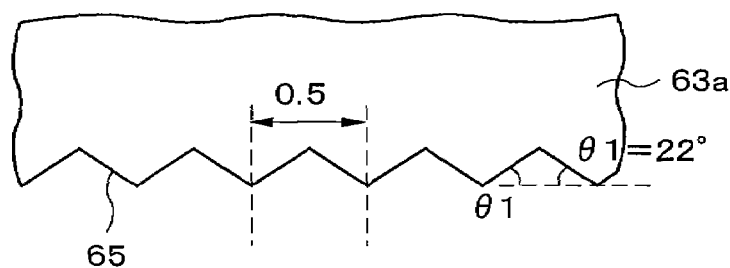
FIG. 33 is an enlarged view showing section B in FIG. 31.
Figure 34:
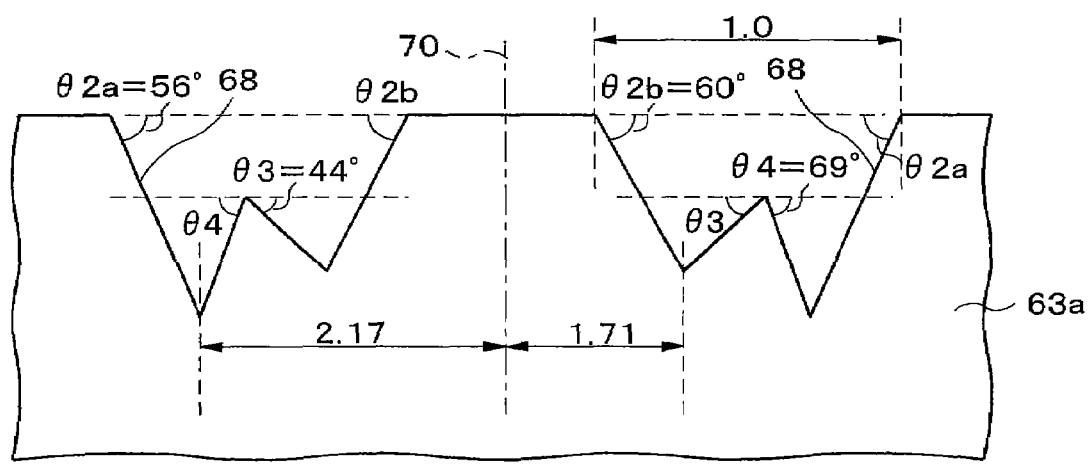
FIG. 34 is an enlarged view showing section C in FIG. 31.
Figure 35:
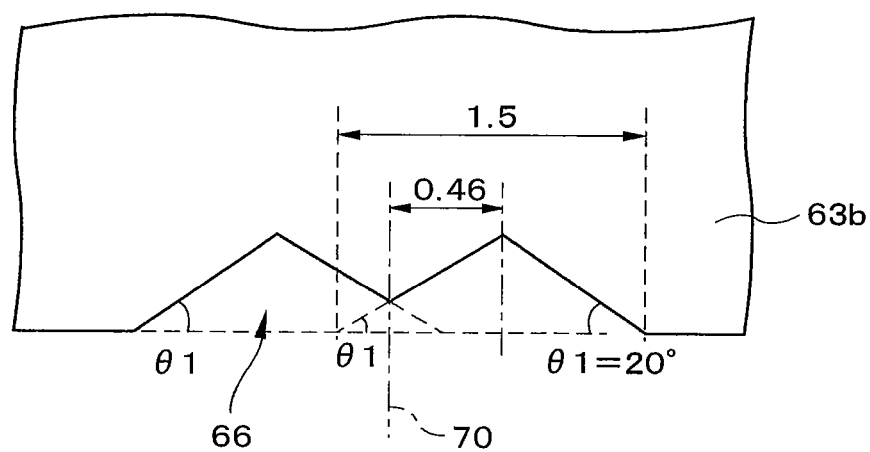
FIG. 35 is an enlarged view showing section D in FIG. 31.
Figure 36:
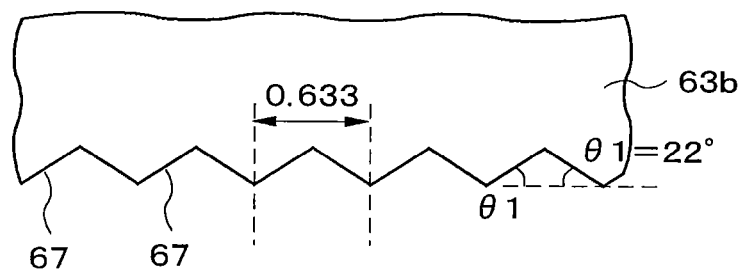
FIG. 36 is an enlarged view showing section E in FIG. 31.
Figure 37:
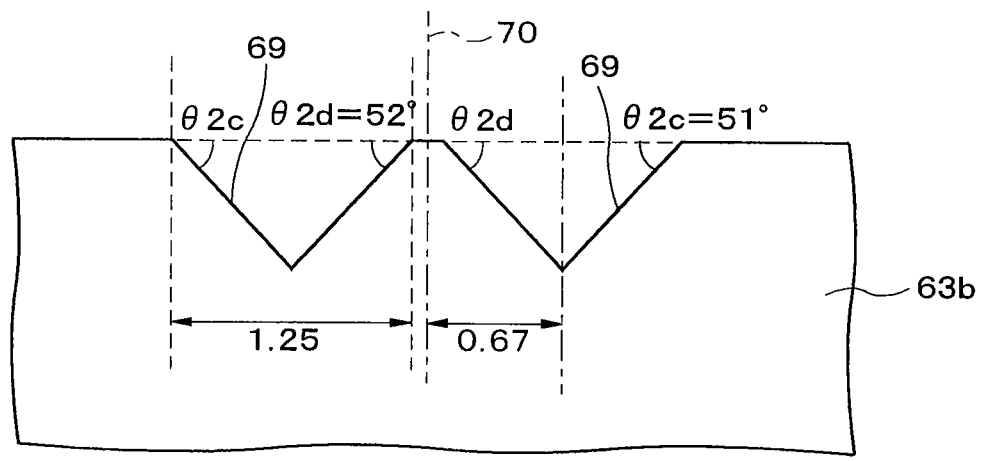
FIG. 37 is an enlarged view showing section F in FIG. 31.

An example 2 is next described. FIG. 31 is an optical model diagram of an illumination device according to example 2; FIG. 32 is an enlarged view showing section A in FIG. 31; FIG. 33 is an enlarged view showing section B in FIG. 31; FIG. 34 is an enlarged view showing section C in FIG. 31; FIG. 35 is an enlarged view showing section D in FIG. 31; FIG. 36 is an enlarged view showing section E in FIG. 31; and FIG. 37 is an enlarged view showing section F in FIG. 31. The dimensions of each part are shown in FIGS. 32 through 37, and the unit of measurement is millimeter (mm).

In example 2, nine white LEDs 62 were disposed at intervals of 8.75 mm, as shown in FIG. 35. The angle at which light was emitted by the white LEDs 62 was ±10 degrees, and the LEDs 62 had a disc-shaped outer contour having a diameter of 5 mm. Two light-guide plates 63a and 63b were disposed on the light-emitting side of the white LEDs 62. A reflecting plate (not shown) was additionally disposed in portions that excluded the light-emitting side of the light-guide plate 63b so as to cover the white LEDs 62 and the light-guide plates 63a and 63b. In the illumination device 61, light emitted from a single white LED 62 was thereby split into four beams, divided by the two-level light-guide plate, and made uniform.

On the light-receiving surface of the light-guide plate 63a, the prisms 65 formed in the area where light from the LEDs 62 was directly incident were configured so that the distance between the apexes of the prisms 65 was 1.25 mm and the angle of inclination θ1 was 20 degrees, as shown in FIG. 32. Flat parts were not provided between the prisms 65. The apexes, i.e., innermost points, of the prisms 65 were disposed on the central axes 70 of the LEDs 62.

On the light-receiving surface of the light-guide plate 63a, the prisms 65 formed in the area where light from the LEDs 62 was directly incident were configured so that the distance between the apexes of the prisms 65 was 0.5 mm, and the angle of inclination θ1 was 22 degrees, as shown in FIG. 33. Flat parts were not provided between the prisms 65.

A pair of W-shaped prisms 68 was formed on the light-emitting surface of the light-guide plate 63a at positions corresponding to the central axes 70 of the LEDs 62, as shown in FIG. 34. The distance from the central axes 70 of the LEDs 62 to the shallow apexes of the prisms 68 was 1.71 mm; the distance to the deep apexes was 2.17 mm; the width of the prisms 68 was 1.0 mm; the angle of inclination θ2a of the inclined surfaces furthest from the central axes 70, which is on of the angles of inclination of the prisms 68, was 56 degrees; the angle of inclination θ2b of the inclined surfaces nearest the central axis 70 was 60 degrees; the angle of inclination θ3 of the inclined surfaces second nearest the central axes 70 was 44 degrees; and the angle of inclination θ4 of the inclined surfaces third nearest was 69 degrees.

A single W-shaped prism 66 was formed about the central axis 70 of the LED 62 on the light-receiving surface of the light-guide plate 63b, as shown in FIG. 35. The prism 66 had the shape of two triangular prisms superposed together. The width of a single triangular prism was 1.5 mm and the angle of inclination was 20 degrees. In addition, the center of the prism 66 was disposed on the central axis 70 of the LED 62, and the distance from the central axis 70 to the apex of the prism 66 was 0.46 mm.

Triangular prisms 67 were formed on the light-receiving surface of the light-guide plate 63b in the areas where the prism 66 was not formed, as shown in FIG. 36. The distance between the apexes of the prisms 67 was 0.633 mm, and the angle of inclination θ1 was 22 degrees. Flat parts were not provided between the prisms 67.

The light-emitting surface of the light-guide plate 63b was configured so that the pair of triangular prisms 69 was formed in a position corresponding to the central axes 70 of the LEDs 62, as shown in FIG. 37. The distance from the central axes 70 of the LEDs 62 to the apexes of the prisms 69 was 0.67 mm, the angle of inclination θ2c of inclined surfaces furthest from the central axes 70, which is one of the angles of inclination of the of the prisms 69, was 51 degrees, and the angle of inclination θ2d of the sides near the central axis 70 was 52 degrees.

Figure 38A:
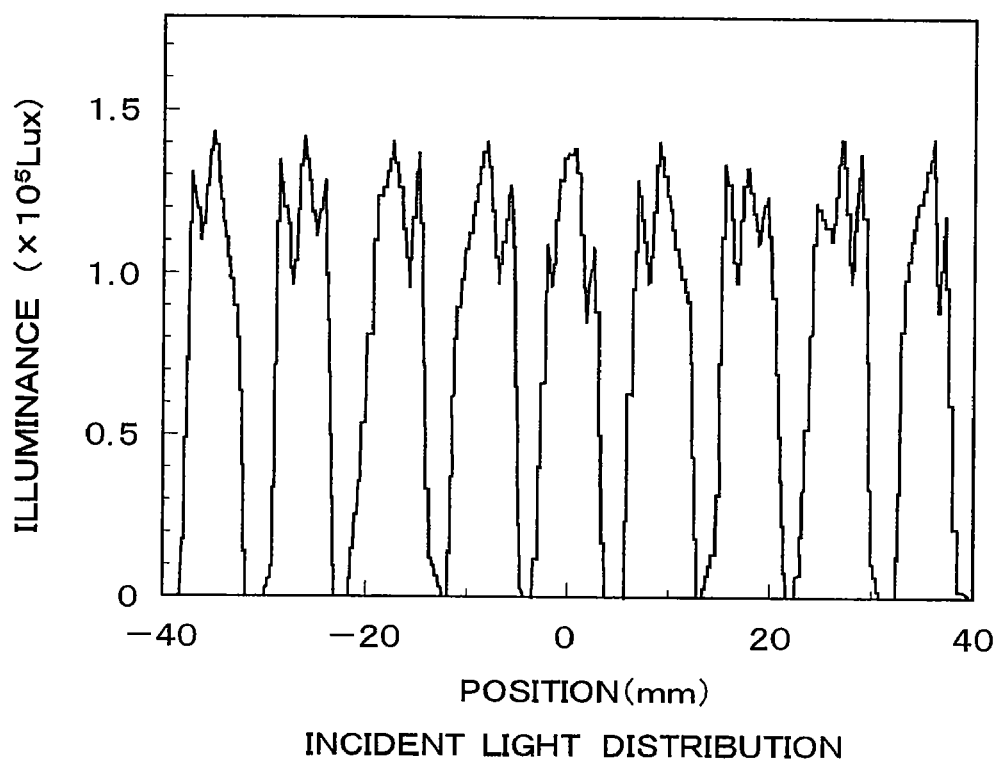
FIG. 38A is a graph showing the distribution of incident light in the illumination device according to Example 2, where the horizontal axis shows the position of an LED in the array direction (X-direction) on a light-receiving surface of a light-guide plate 63a, and the vertical axis shows the intensity of the incident light of the illumination device.
Figure 38B:
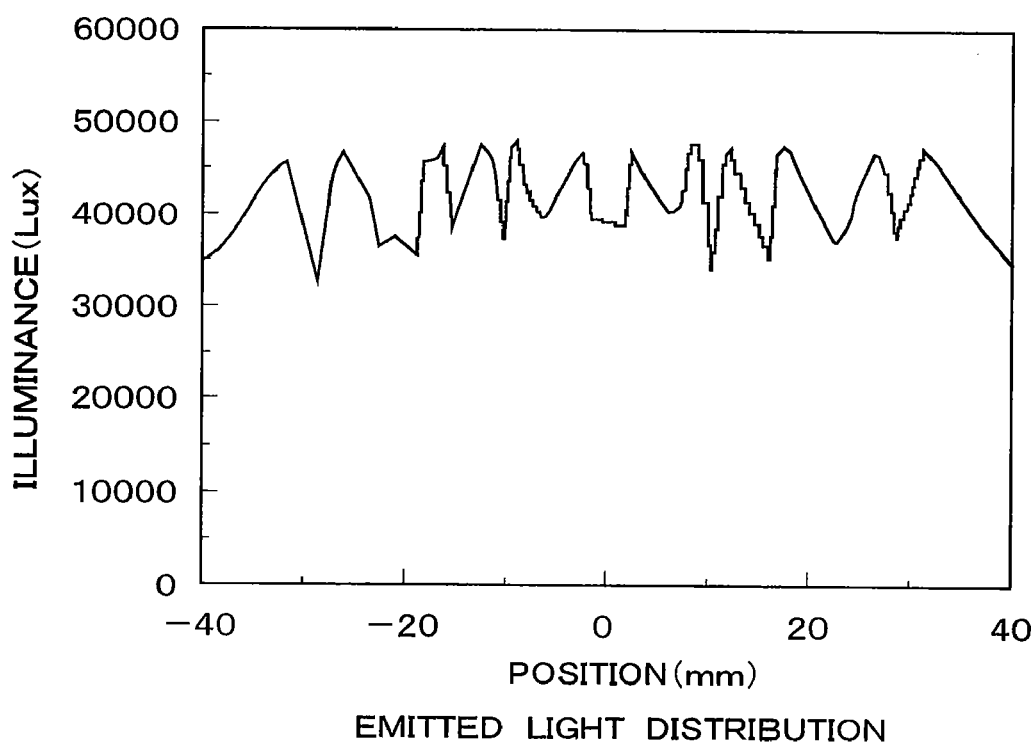
FIG. 38B is a graph showing the distribution of light emitted from the illumination device according to Example 2, where the horizontal axis shows the position in the array direction (X-direction) of the LEDs on the emission surface of the illumination device, and the vertical axis shows the intensity of light emitted from the illumination device.

The illumination device 61 was energized, and the light utilization efficiency and distribution of emitted light thereof were measured. FIG. 38A is a graph showing the distribution of incident light in the illumination device according to example 2, where the horizontal axis shows the position of an LED in the array direction (X-direction) on a light-receiving surface of a light-guide plate 63a, and the vertical axis shows the intensity of the incident light of the illumination device; and FIG. 38B is a graph showing the distribution of light emitted from the illumination device according to example 2, where the horizontal axis shows the position in the array direction (X-direction) of the LEDs on the emission surface of the illumination device, and the vertical axis shows the intensity of light emitted from the illumination device. The center of the centrally located white LED 62, which is one of the nine white LEDs 62, is designated as "0 mm" on the horizontal axes of FIGS. 38A and 38B. The light-utilization efficiency of the illumination device was 82.1%. In addition, the distribution of emitted light was uniform, as shown in FIG. 38 B.

EXAMPLE 3

Figure 39:
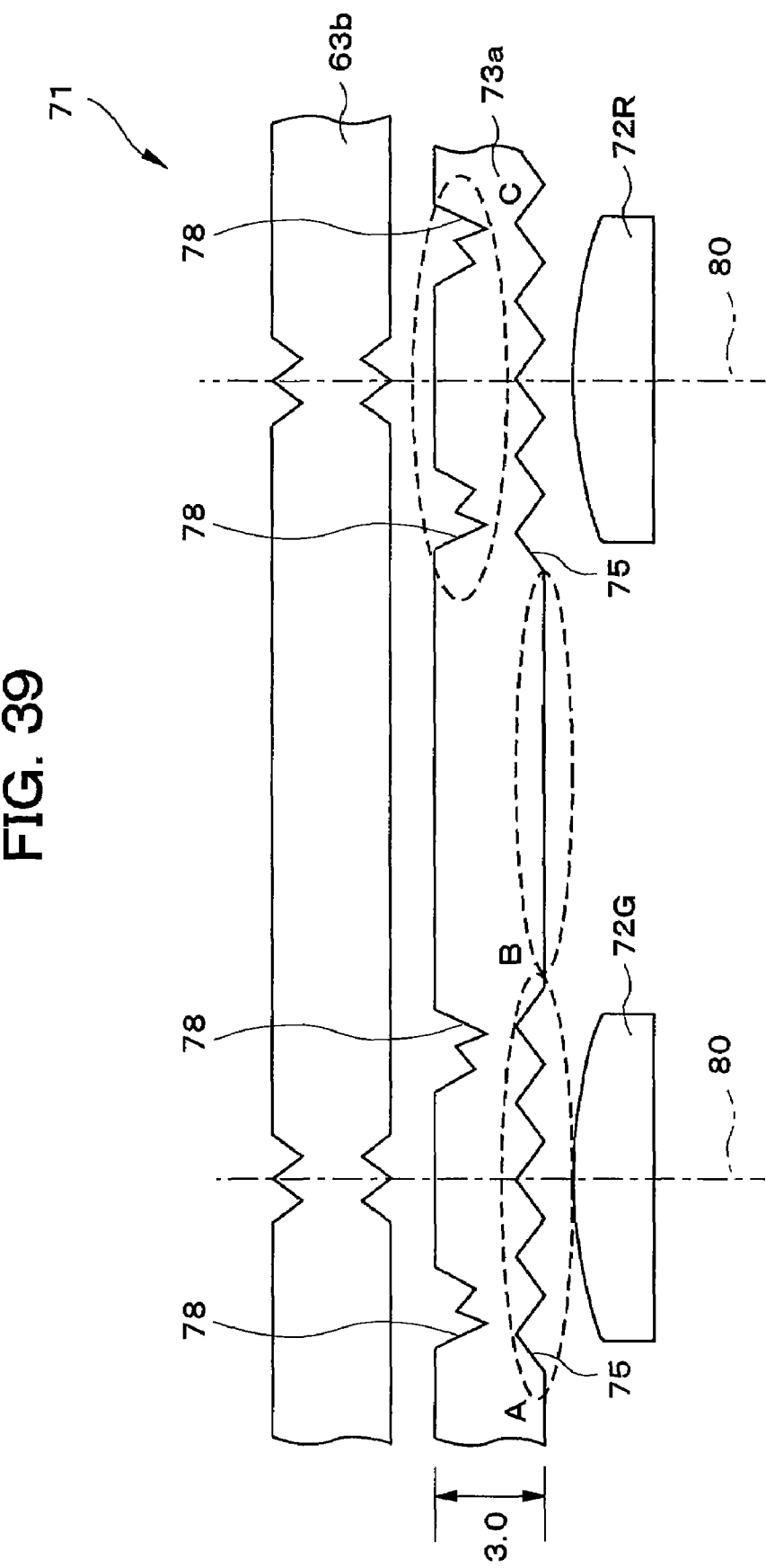
FIG. 39 is an optical model diagram showing an illumination device according to Example 3.
Figure 40:
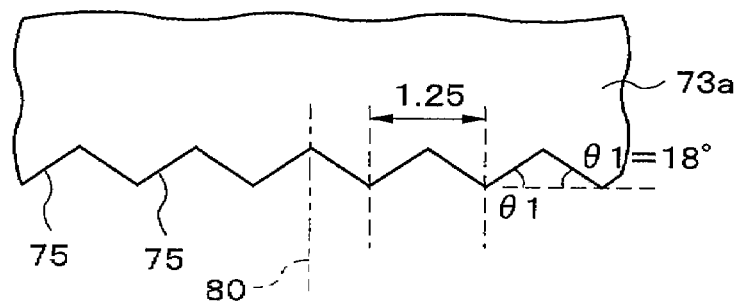
FIG. 40 is an enlarged view showing section A in FIG. 39.
Figure 41:
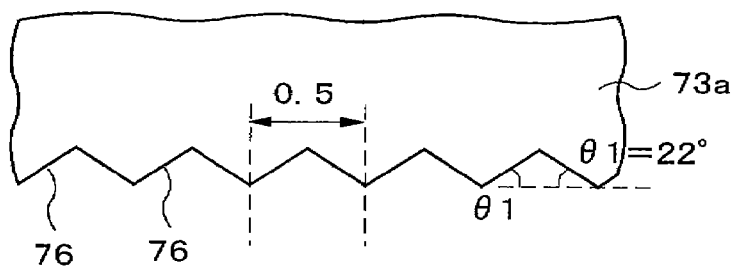
FIG. 41 is an enlarged view showing section B in FIG. 39.
Figure 42:
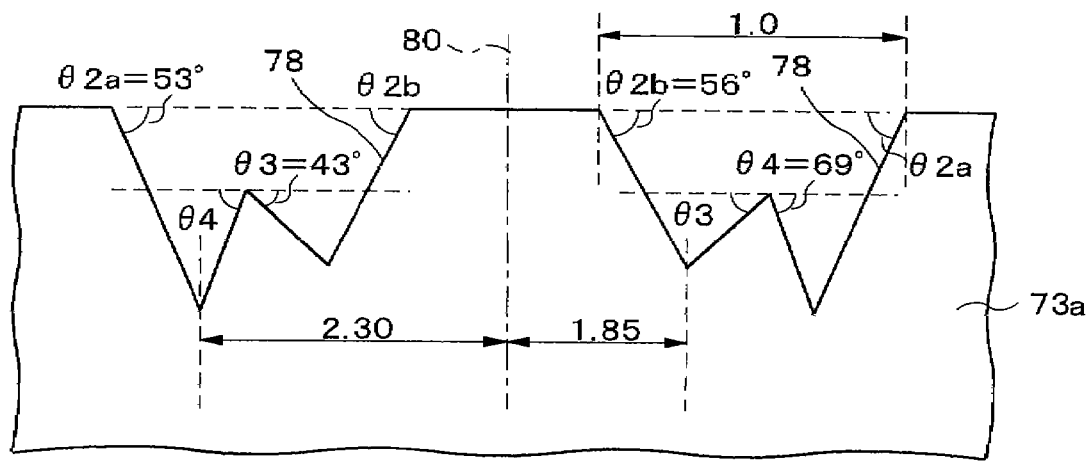
FIG. 42 is an enlarged view showing section C in FIG. 39.

An example 3 is next described. FIG. 39 is an optical model diagram showing an illumination device according to example 3; FIG. 40 is an enlarged view showing section A in FIG. 39; FIG. 41 is an enlarged view showing section B in FIG. 39; and FIG. 42 is an enlarged view showing section C in FIG. 39. The dimensions of each part are shown in FIGS. 40 through 42, and the unit of measurement is millimeter (mm).

In example 3, three each of a red LED 72R, a green LED 72G, and a blue LED (not shown), for a total of 9 LEDS, were arrayed in an order of "BGRBGRBGR," as shown in FIG. 39.

The array interval of the LEDs was 8.75 mm. The angle at which light was emitted by the LEDs 52 was ±10 degrees, and the LEDs 52 had a disc-shaped outer contour having a diameter of 5 mm. A light-guide plate 73a was disposed on the light-emitting side of the LEDs; and a light-guide plate 63b was disposed on the light-emitting side of the light-guide plate 73a. The light-guide plate 63b was the same as the light-guide plate 63b used in example 2 above. An illumination device 71 was thereby produced.

Triangular prisms 75 were formed in the areas of the light-receiving surface of the light-guide plate 73a where light from the LEDs 72 was directly incident, as shown in FIG. 40. The distance between the apexes of the prisms 75 was 1.25 mm, and the angle of inclination θ1 was 18 degrees. Flat parts were not provided between the prisms 75. The apexes, i.e., innermost points, of the prisms 75 were disposed on the central axes 80 of the LEDs 72.

Triangular prisms 76 were formed in the areas of the light-receiving surface of the light-guide plate 73a where light from the LEDs 72 was not directly incident, as shown in FIG. 41. The distance between the apexes of the prisms 76 was 0.5 mm, and the angle of inclination θ1 was 22 degrees. Flat parts were not provided between the prisms 76.

A pair of W-shaped prisms 78 was formed on the light-emitting surface of the light-guide plate 73a at positions corresponding to the central axes 80 of the LEDs 72, as shown in FIG. 42. The distance from the central axes 80 of the LEDs 72 to the shallow apexes of the prisms 78 was 1.85 mm; the distance to the deep apexes was 2.30 mm; the width of the prisms 78 was 1.0 mm; the angle of inclination θ2a of the inclined surfaces furthest from the central axes 80, which is one of the angles of inclination of the prisms 78, was 53 degrees; the angle of inclination θ2b of the inclined surfaces nearest the central axes 70 was 56 degrees; the angle of inclination θ3 of the inclined surfaces second nearest the central axes 80 was 43 degrees; and the angle of inclination θ4 of the inclined surfaces third nearest was 69 degrees.

Figure 43:
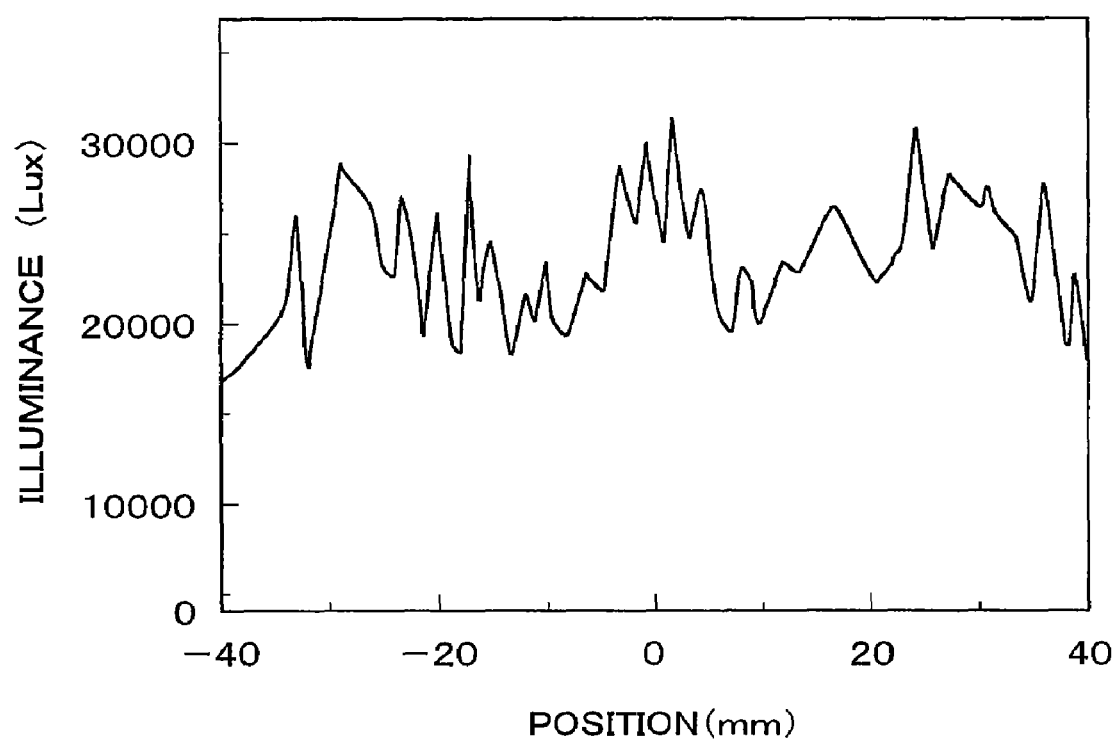
FIG. 43 is a graph showing the distribution of light emitted from the illumination device according to Example 3, where the horizontal axis shows the position of an LED in the array direction (X-direction) on an emission surface of the illumination device, and the vertical axis shows the intensity of light emitted by the illumination device.

The illumination device 71 was energized, and the light-utilization efficiency and distribution of emitted light thereof were measured. At this time, the ratio of colored light (R:G:B) was 3:6:1. FIG. 43 is a graph showing the distribution of light emitted from the illumination device according to example 3, where the horizontal axis shows the position of an LED in the array direction (X-direction) on an emission surface of the illumination device, and the vertical axis shows the intensity of light emitted by the illumination device. The center of the centrally located green light LED 72G, which is one of the nine LEDS, was designated as "0 mm" on the horizontal axis of FIG. 43. The light-utilization efficiency of the illumination device was 74.6%. In addition, the distribution of emitted light was uniform, as shown in FIG. 43.

Examples of applications of the present invention include illumination (backlights) for liquid crystal display devices and indoor lighting.

What is claimed is:

1. An illumination device comprising:
    a light source; and
    a light-guide plate for receiving, via a first surface thereof, light emitted from said light source, and emitting the light via a second surface thereof; wherein
    said light-guide plate has:
    a plurality of condensers that are formed on said first surface and that condense the light incident from said light source; and
    a light divider that is formed on said second surface and that divides the light condensed by said condensers in a plurality of mutually different directions that intersect with a thickness direction of said light-guide plate; and
    wherein
    light condensed by one of said condensers and divided by said light divider is emitted from said second surface by another of said condensers.

2. The illumination device according to claim 1, wherein a plurality of said light sources are provided; and
    another light source is disposed within an area where the light emitted from one of said light sources is divided, as seen from the thickness direction of said light-guide plate.

3. The illumination device according to claim 1, wherein said condensers are prisms.

4. The illumination device according to claim 3, wherein each of said prisms is composed of two inclined surfaces extending in a single direction; and
    said prisms are triangular prisms whose cross sectional shapes perpendicular to said single direction are triangular.

5. The illumination device according to claim 4, wherein the below equations are satisfied, where θ1 is the angle between said inclined surfaces and said first surface, α is the angle between the direction of propagation of light divided by said light divider and said first surface, and n is the index of refraction of said light-guide plate.

$$\theta 1 \leq 90 - \tan^{-1}\left(\frac{\sin\alpha}{\cos\alpha - \frac{1}{n}}\right)$$

$$\alpha < 90 - \sin^{-1}\left(\frac{1}{n}\right).$$

6. The illumination device according to claim 4, wherein the angle between said first surface and said inclined surface formed in an area on said first surface on which light emitted from said light source is directly incident is smaller than the angle between said first surface and said inclined surface formed in an area on which light emitted from said light source is not directly incident.

7. The illumination device according to claim 5, wherein angle θ1 between said first surface and said inclined surface formed in an area on which light emitted from said light source is not directly incident further satisfies the equations below.

$$\alpha + \theta 1 < 90 - \sin^{-1}\left(\frac{1}{n}\right)$$

$$\alpha + 2 \times \theta 1 > 90 - \sin^{-1}\left(\frac{1}{n}\right).$$

8. The illumination device according to claim 5, wherein angle θ1 between said first surface and said inclined surface formed in an area on which light emitted from said light source is not directly incident further satisfies the equations below.

$$\alpha - \theta 1 > 0$$

$$180 - \theta 1 - \alpha < 90 - \sin^{-1}\left(\frac{1}{n}\right)$$

$$180 - \alpha > 90 - \sin^{-1}\left(\frac{1}{n}\right).$$

9. The illumination device according to claim 3, wherein each of said prisms is a W-shaped prism which is composed of four inclined surfaces that extend in a single direction, and whose cross-sectional shape perpendicular to said single direction is W-shaped.

10. The illumination device according to claim 3, wherein flat parts are formed between said prisms on said first surface.

11. The illumination device according to claim 1, wherein said light divider is a prism.

12. The illumination device according to claim 11, wherein said prism is a triangular prism which is composed of two inclined surfaces extending in a single direction, and whose cross sectional shape perpendicular to said single direction is triangular.

13. The illumination device according to claim 12, wherein the equation below is satisfied, where θ2 is the angle between said inclined surfaces and said second surface, β is the angle formed by the direction of propagation of light incident on the inclined surface with respect to said second surface, α is the angle of the direction of propagation of light reflected by the flat surface between said inclined surface and said prism with respect to said second surface, and n is the index of refraction of said light-guide plate.

$$\theta 2 = \frac{\alpha - \beta + 180}{2}.$$

14. The illumination device according to claim 12, wherein the equations below is satisfied, where θ2 is the angle between said inclined surfaces and said second surface, β is the angle of the direction of propagation of light incident on the inclined surface with respect to said second surface, α is the angle formed by the direction of propagation of light reflected by said inclined surface with respect to said second surface, and n is the index of refraction of said light-guide plate.

$$\theta 2 = \frac{180 - \alpha - \beta}{2}$$

$$180 - \theta 2 - \beta < 90 - \sin^{-1}\left(\frac{1}{n}\right).$$

15. The illumination device according to claim 11, wherein each of said prisms is a W-shaped prism which is composed of four inclined surfaces that extend in a single direction, and whose cross-sectional shape perpendicular to said single direction is W-shaped.

16. The illumination device according to claim 1, wherein the center point between said condensers does not match the center of said light divider, as seen from the thickness direction of said light-guide plate.

17. The illumination device according to claim 1, wherein a plurality of said light-guide plates are provided;
said light-guide plates are arrayed along a thickness direction thereof;
part of the light emitted from said light source is divided by one of said light-guide plates; and
another part of the light emitted from said light source is divided by another of said light-guide plates.

18. The illumination device according to claim 17, wherein the phase of the condenser formed on one of said light-guide plates and the phase of the condenser formed on another of said light-guide plates are different from each other, as seen from the thickness direction of said light-guide plate.

19. The illumination device according to claim 17, wherein
said light-guide plates are disposed at a distance from each other; and
an air layer is formed between said light-guide plates.

20. The illumination device according to claim 1, wherein said light source is a light-emitting diode.

21. The illumination device according to claim 20, wherein a plurality of said light-emitting diodes are two-dimensionally arrayed along said first surface.

22. The illumination device according to claim 1, comprising a planar light-guide plate for dispersing light incident from said light-guide plate in a plane.

23. The illumination device according to claim 22, wherein
said light-guide plate and said planar light-guide plate are disposed at a distance from each other; and
an air layer is formed between said light-guide plate and said planar light-guide plate.

24. The illumination device according to claim 22, wherein a prism is formed on the surface of said planar light-guide plate for receiving light from said light-guide plate.

25. The illumination device according to claim 1, comprising a dispersion sheet or dispersion plate that is disposed on said second surface side of said light-guide plate and that disperses the light incident from said light-guide plate.

26. The illumination device according to claim 1, comprising a reflecting plate provided to at least part of an area that excludes said second surface side of said light-guide plate, which is an area that covers said light source and said light-guide plate.

27. A display device comprising:
the illumination device according to claim 1; and
a display panel for receiving light emitted from the illumination device.

28. The display device according to claim 27, wherein said display panel is a transmissive liquid crystal display.

* * * * *